(12) United States Patent
Jedrzejewski et al.

(10) Patent No.: US 8,673,240 B2
(45) Date of Patent: Mar. 18, 2014

(54) MICROFLUIDIC DEVICES AND METHODS

(75) Inventors: Paul Jedrzejewski, Menlo Park, CA (US); Nock Steffen, Redwood City, CA (US); Peter Wagner, Belmont, CA (US); Pierre Indermuhle, Hayward, CA (US); Frank G. Zaugg, Belmont, CA (US)

(73) Assignee: Zyomyx, Inc., Hayward, CA (US)

( * ) Notice: Subject to any disclaimer, the term of this patent is extended or adjusted under 35 U.S.C. 154(b) by 0 days.

(21) Appl. No.: 12/210,389

(22) Filed: Sep. 15, 2008

(65) Prior Publication Data
US 2009/0028755 A1 Jan. 29, 2009

Related U.S. Application Data

(60) Division of application No. 10/603,339, filed on Jun. 24, 2003, now Pat. No. 7,438,856, which is a continuation of application No. 10/208,381, filed on Jul. 29, 2002, now Pat. No. 6,730,516, which is a division of application No. 09/792,488, filed on Feb. 23, 2001, now Pat. No. 6,454,924.

(60) Provisional application No. 60/225,999, filed on Aug. 16, 2000, provisional application No. 60/184,381, filed on Feb. 23, 2000.

(51) Int. Cl.
*G01N 15/06* (2006.01)
(52) U.S. Cl.
USPC ............ 422/503; 422/50; 422/68.1; 422/81; 422/100; 422/101; 422/102; 422/103; 436/43; 436/174; 436/180

(58) Field of Classification Search
USPC .......... 422/68.1, 81, 100, 103, 502, 503, 509; 436/43
See application file for complete search history.

(56) References Cited

U.S. PATENT DOCUMENTS

| 3,938,961 | A | | 2/1976 | Lanier et al. |
| 4,071,409 | A | | 1/1978 | Messing et al. |
| 4,233,029 | A | * | 11/1980 | Columbus ..................... 436/174 |
| 4,714,874 | A | * | 12/1987 | Morris et al. ................. 324/601 |
| 4,756,884 | A | * | 7/1988 | Hillman et al. ................ 422/73 |
| 5,041,266 | A | | 8/1991 | Fox |
| 5,143,854 | A | | 9/1992 | Pirrung et al. |

(Continued)

FOREIGN PATENT DOCUMENTS

| DE | 19754978 A1 | 7/1999 |
| GB | 2332273 A | 6/1999 |

(Continued)

OTHER PUBLICATIONS

Ahn, et al. "Microfluldic Devices and Systems II" (SPIE—The International society for Optical Engineering, Sep. 20-21, 1999).

(Continued)

*Primary Examiner* — Brian J Sines
(74) *Attorney, Agent, or Firm* — Kilpatrick Townsend & Stockton LLP

(57) ABSTRACT

Disclosed herein are devices and methods useful for the detection and analysis of various analytes. The analyte detection device of this invention has the general structure of a substrate and a plurality of pillars attached to the surface of the substrate.

24 Claims, 25 Drawing Sheets

(56) References Cited

U.S. PATENT DOCUMENTS

| | | | |
|---|---|---|---|
| 5,160,378 A | 11/1992 | Tuunanen et al. | |
| 5,252,743 A | 10/1993 | Barrett et al. | |
| 5,288,514 A | 2/1994 | Ellman | |
| 5,304,487 A | 4/1994 | Wilding et al. | |
| 5,405,783 A | 4/1995 | Pirrung et al. | |
| 5,585,069 A | 12/1996 | Zanzucchi et al. | |
| 5,603,351 A | 2/1997 | Cherukuri et al. | |
| 5,620,850 A | 4/1997 | Bamdad et al. | |
| 5,624,711 A | 4/1997 | Sundberg et al. | |
| 5,632,876 A | 5/1997 | Zanzucchi et al. | |
| 5,705,338 A * | 1/1998 | Piran et al. | 435/6.16 |
| 5,750,015 A | 5/1998 | Soane et al. | |
| 5,770,721 A * | 6/1998 | Ershov et al. | 536/25.3 |
| 5,831,184 A | 11/1998 | Willard et al. | |
| 5,843,767 A | 12/1998 | Beattle | |
| 5,849,208 A | 12/1998 | Hayes et al. | |
| 5,858,188 A | 1/1999 | Soane et al. | |
| 5,858,804 A | 1/1999 | Zanzucchi et al. | |
| 5,859,431 A | 1/1999 | Cotrell et al. | |
| 5,867,266 A | 2/1999 | Craighead | |
| 5,872,010 A | 2/1999 | Karger et al. | |
| 5,876,675 A * | 3/1999 | Kennedy | 422/99 |
| 5,894,063 A | 4/1999 | Hutchens et al. | |
| 5,942,443 A | 8/1999 | Parce et al. | |
| 5,980,704 A | 11/1999 | Cherukuri et al. | |
| 6,007,690 A | 12/1999 | Nelson et al. | |
| 6,020,208 A | 2/2000 | Hutchens et al. | |
| 6,024,925 A | 2/2000 | Little et al. | |
| 6,027,942 A | 2/2000 | Hutchens et al. | |
| 6,042,709 A * | 3/2000 | Parce et al. | 204/453 |
| 6,043,031 A | 3/2000 | Koster et al. | |
| 6,044,981 A | 4/2000 | Chu et al. | |
| 6,046,056 A | 4/2000 | Parce et al. | |
| 6,048,498 A | 4/2000 | Kennedy | |
| 6,068,752 A | 5/2000 | Dubrow et al. | |
| 6,097,097 A | 8/2000 | Hirose | |
| 6,107,044 A | 8/2000 | Nikiforov | |
| 6,113,855 A * | 9/2000 | Buechler | 422/58 |
| 6,153,073 A | 11/2000 | Dubrow et al. | |
| 6,156,270 A * | 12/2000 | Buechler | 422/417 |
| 6,167,910 B1 * | 1/2001 | Chow | 137/827 |
| 6,171,850 B1 | 1/2001 | Nagle et al. | |
| 6,186,660 B1 | 2/2001 | Kopf-Sill et al. | |
| 6,274,089 B1 | 8/2001 | Chow et al. | |
| 6,296,126 B1 * | 10/2001 | Peters | 210/456 |
| 6,318,970 B1 | 11/2001 | Backhouse | |
| 6,454,924 B2 * | 9/2002 | Jedrzejewski et al. | 204/601 |
| 6,503,757 B1 | 1/2003 | Chow | |
| 6,582,969 B1 * | 6/2003 | Wagner et al. | 436/518 |
| 6,720,157 B2 * | 4/2004 | Indermuhle et al. | 435/7.1 |
| 6,730,516 B2 * | 5/2004 | Jedrzejewski et al. | 436/43 |
| 7,438,856 B2 * | 10/2008 | Jedrzejewski et al. | 422/100 |

FOREIGN PATENT DOCUMENTS

| | | |
|---|---|---|
| WO | WO9428418 A1 | 12/1994 |
| WO | WO9820019 A1 | 5/1998 |
| WO | WO 98/32535 A1 | 7/1998 |
| WO | WO9841323 A1 | 9/1998 |
| WO | WO9859362 A1 | 12/1998 |
| WO | WO0004382 A1 | 1/2000 |
| WO | WO0004389 A2 | 1/2000 |
| WO | WO0004390 A2 | 1/2000 |
| WO | WO0008388 A1 | 2/2000 |
| WO | WO0014197 A1 | 3/2000 |
| WO | WO0015321 A1 | 3/2000 |

OTHER PUBLICATIONS

Desai et al., "A MEMS Electrostatic Particle Transportation System," *Sensors and Actuators A: Physical* (1999).

Ducrée, et al. "Topspot—A New Method for the Fabrication of Microarrays" (IEEE Apr. 2000).

Petersen et al., "The Promise of Miniaturized Clinical Diagnostic Systems" (IVDT Archive, Jul. 1998).

* cited by examiner

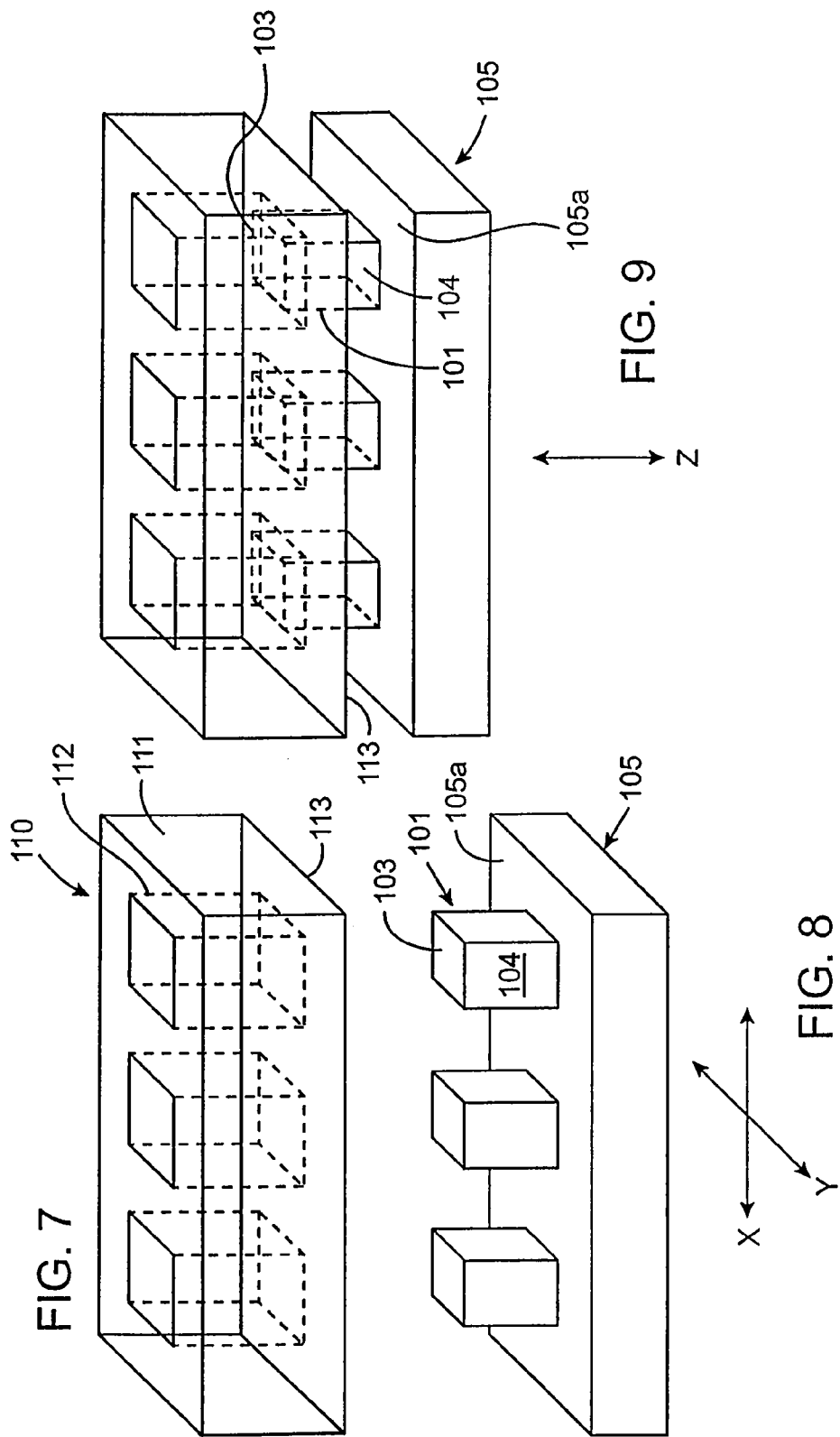

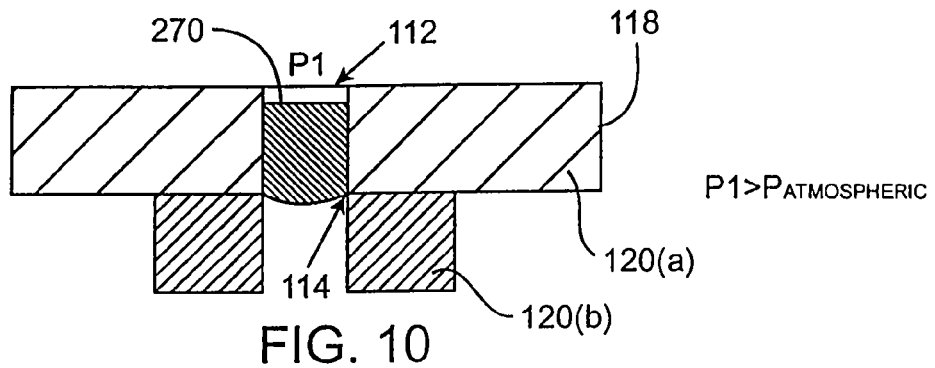
FIG. 10
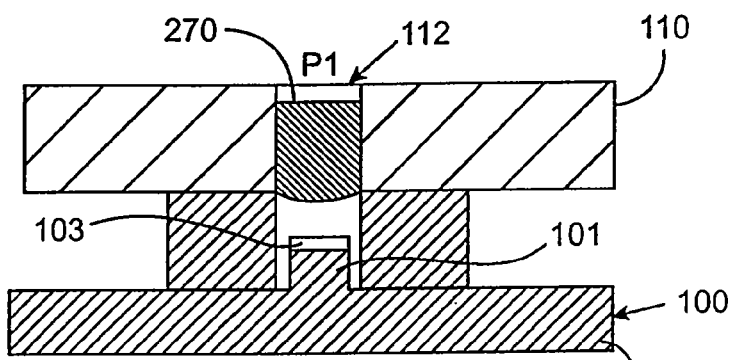
FIG. 11
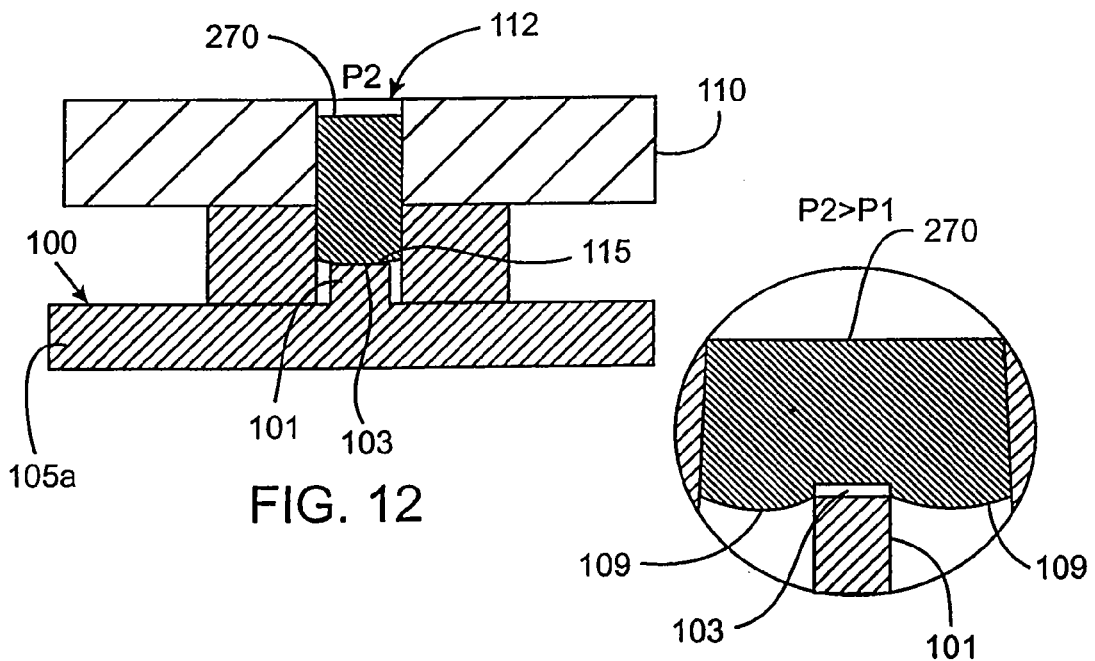
FIG. 12
FIG. 13

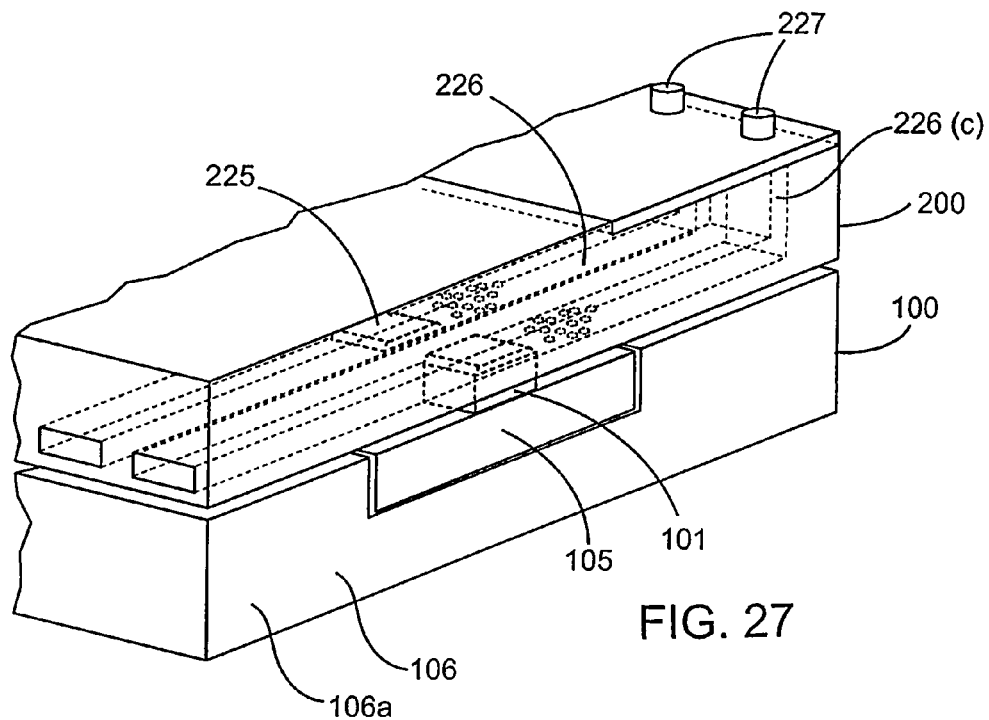
FIG. 27
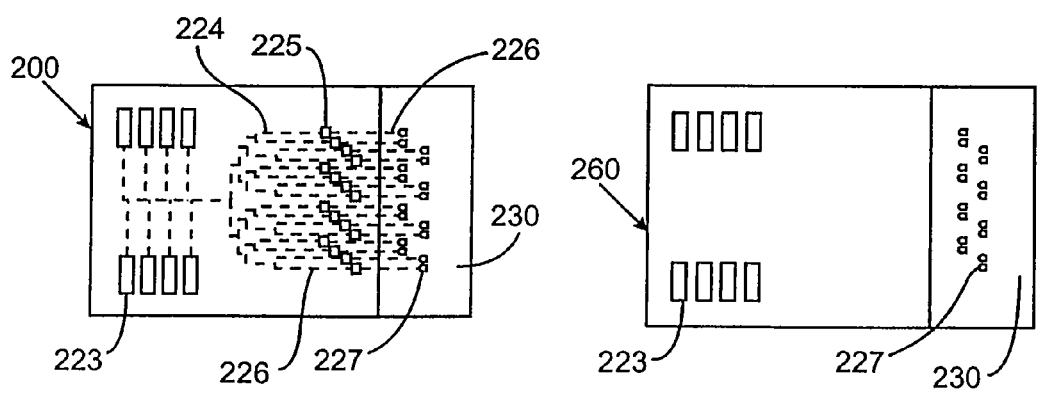
FIG. 28
FIG. 29

MICROFLUIDIC DEVICES AND METHODS

CROSS-REFERENCES TO RELATED APPLICATIONS

This application is a division of U.S. Nonprovisional patent application Ser. No. 10/603,339, filed Jun. 24, 2003, which in turn is a continuation of U.S. Nonprovisional patent application Ser. No. 10/208,381, filed Jul. 29, 2002, now U.S. Pat. No. 6,730,516, which in turn is a division of U.S. Nonprovisional patent application Ser. No. 09/792,488, filed Feb. 23, 2001, now U.S. Pat. No. 6,454,924, which in turn claims the benefit of U.S. Provisional Patent Application No. 60/225,999, filed Aug. 16, 2000 and also the benefit of U.S. Provisional Patent Application No. 60/184,381, filed Feb. 23, 2000. All of the above provisional and non-provisional patent applications are herein incorporated by reference in their entirety for all purposes and are all assigned to the same assignee as the present application.

BACKGROUND OF THE INVENTION

Conventional methods for performing high throughput mass spectrometric (MS) protein identification employ either 2D-PAGE technology or various modes of multidimensional chromatography. 2D-PAGE is commonly used in proteomics (i.e., the study of proteins). In a typical 2D-PAGE process, 3000 to 5000 different proteins can been separated. After separating, spots of the separated proteins can be cut out and analyzed using mass spectrometry.

Conventional 2D-PAGE technology, however, has a number of drawbacks. Drawbacks include low sensitivity (e.g., 1 ng protein detection limit with silver staining), the limited range of proteins that can be analyzed, (membrane proteins, high molecular, low molecular proteins are underrepresented), and low sample throughput. The low sample throughput is due to the labor and time intensiveness of this method. For example, 2D-PAGE systems allow for the processing of only 10 gels in two days per system. In order to take advantage of MS, additional equipment (e.g., robotic gel spot cutters and digest workstations) is required. Besides being complex and costly, these automated systems are not generally suited to identify low abundance proteins.

Other chromatographic methods based on multidimensional chromatography (e.g., LC-LC) may offer faster analysis cycles. However these methods have limitations including low detection limits and the limited scope of proteins that may be analyzed (e.g., due to solution condition limitations imposed by the selected chromatographic method).

Embodiments of the invention address these and other problems.

SUMMARY OF INVENTION

One embodiment of the invention is directed to a microanalysis chip comprising a body defining at least one transfer-separation channel including a channel bottom having a bottom opening, the transfer-separation channel terminating in a discharge aperture.

Another embodiment of the invention is directed to a method for chemically affecting a sample, the method comprising: providing a microanalysis chip including a body having a transfer-separation channel with a channel bottom having a bottom opening; inserting a pillar into the bottom opening such that a sample supported by the pillar communicates with the transfer-separation channel; and passing a reagent fluid into the transfer-separation channel in order for the reagent fluid to come in contact with the sample to chemically affect the sample.

Another embodiment of the invention is directed to a dispenser assembly comprising: a dispenser chip including a dispenser body including a vertical channel; and a sample chip having a base and a sample structure, the sample structure comprising a pillar and a sample surface, wherein the vertical channel of the dispenser chip is cooperatively structured to receive the pillar.

Another embodiment of the invention is directed to a microfluidic chip comprising: a body having a bottom surface; a plurality of discharge apertures; and a plurality of transfer-separation channels in the body, each transfer-separation channel defined by a channel bottom with a bottom opening, and having a portion upstream of the bottom opening and a portion downstream of bottom opening, and wherein each transfer-separation channel terminates at one of the discharge apertures.

Another embodiment of the invention is directed to a microfluidic assembly comprising: a microfluidic chip comprising (i) a body having a bottom surface, (ii) a plurality of discharge apertures, and (iii) a plurality of transfer-separation channels in the body, each transfer-separation channel defined by a channel bottom with a bottom opening, and having a portion upstream of the bottom opening and a portion downstream of bottom opening, and wherein each transfer-separation channel terminates at one of the discharge apertures; and a sample chip comprising a base including a non-sample surface and a plurality of sample structures having a plurality of sample surfaces.

Another embodiment of the invention is directed to a method of processing an analyte, the method comprising: processing an analyte on a sample surface on an sample chip; transferring the processed analyte through a transfer-separation downstream of the sample surface, wherein the transfer-separation channel is in a microfluidic chip above the sample chip; and analyzing the processed analyte downstream of the sample surface.

Another embodiment of the invention is directed to a microfluidic chip comprising: a body having a bottom surface; and a plurality of vertical channels in the body, wherein each opening is cooperatively structured to receive a pillar of a sample chip.

Another embodiment of the invention is directed to a method of processing analytes, the method comprising: inserting a plurality of sample surfaces into a plurality of vertical channels in a dispenser chip, wherein the plurality of sample surfaces are on pillars of a sample chip; depositing a plurality of liquid samples on the sample surfaces while the sample surfaces are in the vertical fluid channels; binding analytes from the plurality of liquid samples to the sample surfaces; withdrawing the sample surfaces from the vertical fluid channels; inserting the plurality of sample surfaces into a plurality of openings in a microanalysis chip so that the plurality of sample surfaces are in communication with a plurality of transfer-separation channels in the microanalysis chip; and processing the analytes using reagents flowing through the transfer-separation channels while the analytes are bound to the sample surfaces.

Another embodiment of the invention is directed to an analysis system comprising: an analysis assembly comprising (i) a microanalysis chip comprising a body comprising at least one transfer-separation channel defined by a channel bottom having a bottom opening, the transfer-separation channel terminating in a discharge aperture, and (ii) a sample chip having a plurality of sample surfaces; and an analysis device adapted to receive an analyte from the discharge aperture.

These and other embodiments of the invention are described with reference to the Figures and the Detailed Description.

BRIEF DESCRIPTION OF THE DRAWINGS

FIGS. 6(i) to 6(l) show cross-sections of pillars.

FIG. 7 shows a perspective view of a dispenser.

FIG. 8 shows a perspective view of a chip embodiment.

FIG. 9 shows a perspective view of an assembly embodiment.

FIGS. 10-12 shows cross-sectional views of assembly embodiments.

FIG. 13 is a close-up view of a liquid sample on a sample surface of a pillar.

FIGS. 27 and 28 are top views of analytical assemblies with a lid.

FIGS. 29 to 34 show cross-sectional views of the discharge apertures of various microanalysis chip embodiments.

DETAILED DESCRIPTION

Figure 1:
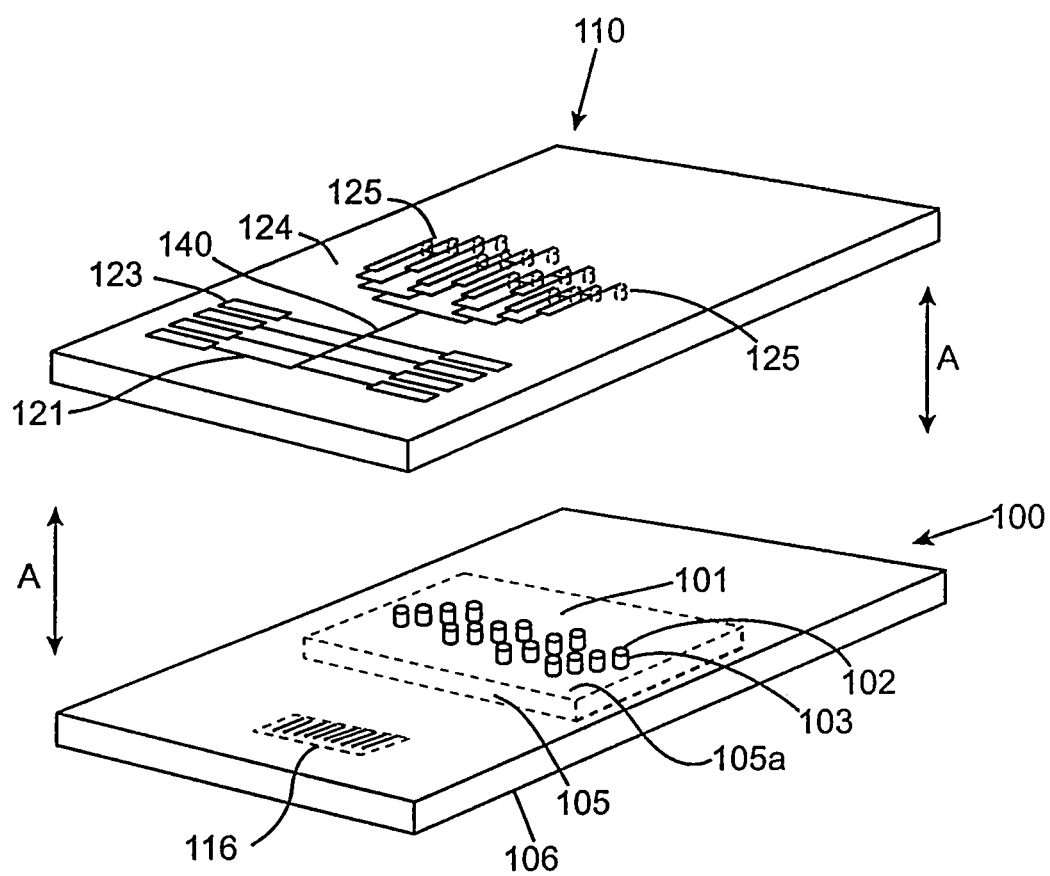
FIG. 1 is a perspective view of a dispenser chip spaced from a chip holder engaging a sample chip.

Embodiments of the invention find utility in the post-genome era of functional genomics or proteomics to decipher the complex interplay among various biological molecules (e.g., genes, gene products, metabolites, proteins) in biological systems. They utilize array type devices for analyte isolation along with microfluidic devices that may have micro-purification capability. The strengths of array-type devices and the strengths of microfluidic type devices may be combined to perform multiple processes in parallel and in an integrated manner.

In commercial settings, embodiments of the invention may be used in the pharmaceutical industry for, e.g., proteomic studies. Using embodiments of the invention, potential drug candidates can be discovered or can be verified as being therapeutic. Embodiments of the invention may also be used as diagnostic tools in a clinical setting for staging or disease progression. They may find use in environmental analyses to track and identify contaminants. In academic research environments, embodiments of the invention may be employed in basic biology or medical research. Embodiments of the invention can be used to characterize and quantify analytes ranging from small organic molecules (e.g., pharmaceuticals, metabolites, pesticides, etc.) to biopolymers (e.g., polypeptides DNA, RNA) at high throughput. Mass spectrometry may be used to characterize and quantify analytes.

Embodiments of the invention include microfluidic assemblies. Typical microfluidic assemblies may include microfluidic devices that are used in conjunction with sample chips. The microfluidic devices may include dispenser chips and microanalysis chips. In a typical embodiment, a dispenser chip and a microanalysis chip may be sequentially interfaced with a sample chip comprising sample structures in an array. Each sample structure may include a pillar and a sample surface on the pillar. Openings at the bottoms of the dispenser and the microanalysis chip can be structured to receive the pillars of the sample chip.

In some embodiments, the dispenser chip may deposit fluids on the sample surfaces of a sample chip. The deposited fluids may process analytes (or analyte derivatives) on the sample surfaces. The microanalysis chip may be also used to process analytes (or analyte derivatives) on the sample surfaces of a sample chip. In addition, the microanalysis chip can prepare analytes for subsequent analysis, and/or transfer to an analysis device. Typically, the prepared analytes may be transferred downstream of the sample surfaces through transfer-separation channels in the microanalysis chip. The prepared analytes may then be discharged from the transfer-separation channels to an analysis device where a desired analysis can take place.

For purposes of illustration, some of the specifically described embodiments below refer to using a dispenser chip or a microanalysis chip to process analytes such as proteins on the sample surfaces of a sample chip. However, it is understood that analyte derivatives may also be processed on the sample surfaces. Analyte derivatives include previously processed analytes. Specific examples of analyte derivatives may include subunits or subunit mixtures of analytes that have been previously cleaved, or analytes that have been derivatized with another substance. For example, an analyte may be a protein while an analyte derivative may be a derivatized protein or a mixture of protein subunits.

The assemblies and chips according to embodiments of the invention can be used in a mass spectrometric analysis to identify and characterize analytes such as proteins. For example, a dispenser chip may be used to deposit liquids containing proteins on an array of sample surfaces of a sample chip. The deposited liquids may comprise complex liquid samples such as cell lysate and bodily fluids. Proteins in the liquid samples bind to the array of sample surfaces to isolate the proteins from other components in the liquid samples.

The proteins may be processed on the sample surfaces of the sample chip so that they are suitable for an analysis such as mass spectrometry. For example, the dispenser chip and/or an analysis chip may be interfaced with the sample chip containing bound proteins. The dispenser or the analysis chip may then deposit processing fluids such as liquid reagents on the sample surfaces. The processing fluids can be used to process the proteins bound to the sample surfaces of the sample chip. Exemplary processing fluids include reagents that can cleave, unfold, or derivatize analytes. Reagents may also include fluids that can separate an immobilized analyte or an analyte derivative from a sample surface. After separation, the analyte or the analyte derivative may be transferred downstream of the sample surface.

Capturing analytes from liquids on a capture array of sample surfaces to isolate the analytes and process them on the sample surfaces provides advantages over conventional analysis methods. For example, such advantages include the isolation of proteins under native conditions, faster analysis times, and the selective enrichment of low abundance proteins.

When the proteins are on the sample surfaces, they may be processed in any suitable manner. For example, the processing fluids dispensed by the dispenser chip or the microanalysis chip may be used to help react, purify, concentrate, and/or separate proteins or protein derivatives so that they are suitable for a mass spectrometry analysis. For instance, a reagent can be delivered to a sample surface to cleave a protein to form a peptide mixture. Solutions (e.g., aqueous, organic, acidic) may be delivered to the sample surface and added to the peptide mixture so that the resulting product can be analyzed by a mass spectrometer.

After processing, an analysis assembly comprising the microanalysis chip and the sample chip may be transported to a mass spectrometer using a translation stage system (e.g., an x-y-z axis positioning system). The processed proteins can be transported in transfer-separation channels in the microanalysis chip to discharge apertures in the microanalysis chip. The processed proteins may then be discharged from the microanalysis chip along with any carrier fluids. After discharging, the processed proteins may be received by a sampling orifice of a mass spectrometer. Once received, the mass spectrometer can create appropriate mass spectra for the received protein mixture to characterize or quantify the received mixture.

Any number of mass spectrometric or spectroscopic techniques may be used. Exemplary techniques include electrospray mass spectrometry (ESI/MS), atmospheric pressure chemical ionization mass spectrometry (APCI/MS), thermospray mass spectrometry (TSP/MS), or matrix assisted laser desorption ionization mass spectrometry (MALDI/MS). For mass analysis, any type of analyzer may used. Exemplary analyzers may include quadrupole, time-of-flight, ion trap, and Fourier transform ion cyclotron resonance analyzers.

The use of the assemblies with mass spectrometric detectors provides high sample throughput, reduced cost per analysis, reduced reagent usage, minimized contamination, and reduced sample losses. The reduction in sample losses results in an increase of the overall sensitivity of the system. Both qualitative and quantitative data may be gathered on particular molecules from various samples (e.g., cell lysate, body fluids, etc.) using embodiments of the invention. The data may be compared in differential type experiments to identify and/or characterize changes of specific molecules as a function of state (e.g., normal vs. disease samples).

I. Dispensing Assemblies

The dispensing assemblies according to embodiments of the invention may include a sample chip that has sample surfaces and a dispenser that dispenses liquids on the sample surfaces. To reduce the potential for cross-contamination between adjacent sample surfaces, the sample surfaces may be elevated with respect to a non-sample surface of the sample chip. Typically, the sample surfaces are on pillars that raise the sample surfaces above the non-sample surface.

In some embodiments, a plurality of liquids may be supplied to the fluid channels in a dispenser. The liquids supplied to the different fluid channels may be the same or different and may contain the same or different components. For example, each of the liquids in respective fluid channels may include different reagents. The dispenser may dispense the liquids on the sample surfaces of a sample chip in parallel. Discrete deposits of liquid samples may be left on the sample surfaces. The liquid samples may contain analytes that are to be bound to the sample surface. Alternatively or additionally, the liquid samples may comprise reagents that are used to process analytes at the sample surfaces.

The liquid samples may include one or more analytes or one or more reagents. The analytes may be organic or inorganic in nature. Suitable analytes may include biological molecules such as polypeptides, DNA, RNA, mRNA, antibodies, antigens, proteins, lipids, oligonucleotides, oligosaccharides, steroids, cholesterols, etc. Other analytes may include cell organelles such as golgi, and chemical compounds such as those used as candidate drugs. Such potential candidate drugs may be fabricated using, for example, combinatorial chemistry techniques. Reagents may include substances that can react with other components on the sample surfaces. More specifically, suitable reagents may include biological or chemical entities that can process components at the sample surfaces. For instance, a reagent may be an enzyme or other substance that can cleave unfold, cleave, or derivatize the proteins at the sample surface. Suitable liquid media in the liquid samples include solutions such as buffers (e.g., acidic, neutral, basic), water, organic solvents, etc.

The liquids from which the liquid samples are obtained may be man-made or naturally occurring. For example, the liquids may be derived from, or be, biological fluids such as blood, urine, plasma, cerespinal fluid, tears, saliva, biopsy samples, etc.

FIG. 1 shows a dispensing assembly including a dispenser chip 110 and a chip assembly 100 comprising a sample chip 105 and a chip holder 106. The dispensing assembly 110 and the chip assembly 100 may move in the direction of the arrows A to engage each other. The dispenser chip 110 may have a structure similar to that of a microanalysis chip. However, dispenser chips typically do not have discharge apertures downstream of the sample surfaces of the sample chips.

The chip holder 106 has a depression that receives the sample chip 105. The sample chip 105 may have sample structures on a base 105a. Each sample structure may comprise a pillar 103 and a sample surface 102. When the sample chip 105 is in the depression, the top surface of the base 105a of the sample chip 105 can be substantially coplanar with the top surface of the chip holder 106. A bar code 116 or other identifier may be present on the chip holder 106.

The dispenser chip 110 includes a plurality of vertical fluid channels 125 that receive the pillars 101 of a sample chip 105. In some instances, the vertical fluid channels 125 may be referred to as "wells". In the dispenser chip 110, the vertical fluid channels 125 are in communication with a distribution network 124. The distribution network 124, in turn, communicates with a main delivery channel 140. A plurality of delivery channels 121 couples reservoirs 123 to the main delivery channel 140. The reservoirs 123 may contain liquids such as reagents and analyte-containing liquids. Although FIG. 1 shows fluid channels in a particular configuration, embodiments of the invention are not limited to dispensers with the particular configuration shown in FIG. 1. For example, in some embodiments, the delivery channels 121 may communicate directly with the reagent distribution network 124 without using a main delivery channel 140.

The fluid channels in the dispenser chip and in the microanalysis chip (described in further detail below) may have any suitable characteristics. In some embodiments, a fluid channel may be defined by three sides. For example, a fluid channel may be defined by two side surfaces and a bottom surface. These surfaces in combination can form an open fluid channel. A fluid channel may also be defined by four sides. For example, a flat plate may be over an open fluid channel to form a closed fluid channel. The fluid channels may have a circular or polygonal (e.g., rectangular) cross-sectional geometry. Regardless of the particular cross-sectional geometry of the fluid channels, the fluid channels may be closed or open to any desired degree as long as fluids are allowed to pass through the fluid channels. In addition, the dimensions of the fluid channels may vary. For example, a cross-sectional dimension of a fluid channel in the dispenser may be between about 0.1 to 500 microns (e.g., about 0.1 to 100 microns). In other embodiments, it may be from about 1.0 to about 500 microns (e.g., about 1 to about 100 microns).

Illustratively, a sample chip 105 having sample structures containing pillars 101 and sample surfaces 103 is interfaced with a dispenser chip 110. The sample chip 105 may be brought in contact with the dispenser chip 110 and the pillars 101 of the sample chip 105 are inserted into the vertical fluid channels 125 of the dispenser chip 110. Liquids in the reservoirs 123 flow through the delivery channels 121, through the common delivery channel 140, through the distribution network 124, and to the desired vertical fluid channel 125. The liquids pass from the vertical fluid channels 125 to the sample surfaces 103 of the pillars 101.

The liquids that contact the sample surfaces 103 may contain analytes that are immobilized on the sample surfaces 103. As explained in detail below, the sample surfaces 103 may be formed by affinity structures that selectively bind particular analytes and thus isolate them from other components in the liquids. Alternatively or additionally, the liquids that contact the sample surfaces 103 may be reagents that may be delivered to the sample surfaces 103 to unfold, derivatize, or cleave the analytes or analyte derivatives (e.g., analytes previously cleaved analyte subunits) that are on the sample surfaces 103. For example, reagents may be delivered to captured analytes in order to fragment them into subunits. In another embodiment, the captured analytes are not fragmented into subunits, but all of the subsequent reactions are performed on an intact analyte. For example, reagents may be deposited on the sample surfaces 103 to prevent the analytes on the sample surfaces 103 from refolding, to enhance the mass spectrometric response, to improve the mass spectrometric fragmentation, and/or to label the analytes or processed analytes to improve the mass spectrometric selectivity. After processing, intact analytes or mixtures of analyte subunits (e.g., protein subunits) can reside on the sample surfaces 103, and the sample chip 105 and the dispenser chip 110 are separated from each other. The dispenser chip 110 may then be used to dispense liquids on other sample chips. The sample chip 105 may be analyzed immediately or stored and processed further at a later time.

Figure 2A:
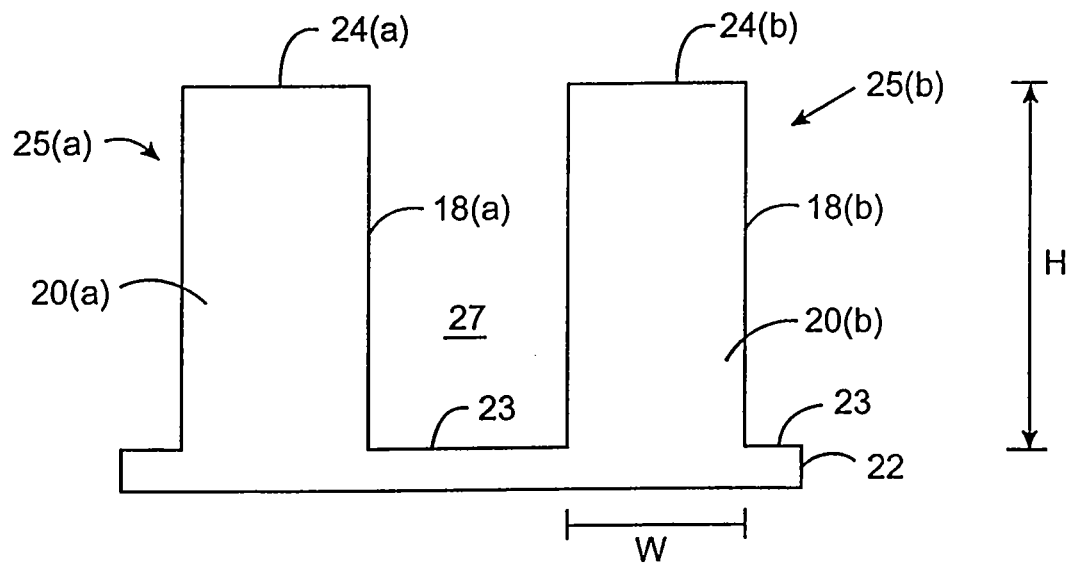
FIGS. 2(a)-2(b) show cross-sections of chips including pillars.

FIG. 2(a) shows a cross-sectional view of a chip according to an embodiment of the invention. The illustrated chip includes a base 22 and sample structures 25(a), 25(b) comprising pillars 20(a), 20(b). The base 22 and the pillars 20(a), 20(b) may form an integral structure formed from the same material. Alternatively, the base 22 and the pillars 20(a), 20(b) may be distinct and may be formed from different materials. Each pillar 20(a), 20(b) may consist of a single material (e.g., silicon), or may include two or more sections of different material.

The base 22 of the chip may have any suitable characteristics. For instance, the base 22 of the chip can have any suitable lateral dimensions. For example, in some embodiments, the base 22 can have lateral dimensions less than about 2 square inches. In other embodiments, the base 22 can have lateral dimensions greater than 2 square inches. The non-sample surface of the base 22 may be generally planar. However, in some embodiments, the base 22 may have a non-planar surface. For example, the base 22 may have one or more troughs. The structures containing the sample surfaces and the pillars may be in the trough. Any suitable material may be used in the base 22. Suitable materials include glass, silicon, or polymeric materials. Preferably, the base 22 comprises a micromachinable material such as silicon.

The pillars 20(a), 20(b) may be oriented substantially perpendicular with respect to the base 22. Each of the pillars 20(a), 20(b) includes a sample surface 24(a), 24(b) and side surfaces 18(a), 18(b). The side surfaces 18(a), 18(b) of the pillars 20(a), 20(b) can define respective sample surfaces 24(a), 24(b) of the pillars 20(a), 20(b). The sample surfaces 24(a), 24(b) may coincide with the top surfaces of the pillars 20(a), 20(b) and are elevated with respect to the non-sample surfaces 23 of the chip. The non-sample surfaces 23 and the sample surfaces 24(a), 24(b) may have the same or different coatings or properties. Adjacent sample surfaces 24(a), 24(b) are separated by a depression 27 that is formed by adjacent pillars 20(a), 20(b) and the non-sample surface 23.

The pillars 20(a), 20(b) may have any suitable geometry. For example, the cross-sections (e.g., along a radius or width) of the pillars may be circular or polygonal. Each of the pillars 20(a), 20(b) may also be elongated. While the degree of elongation may vary, in some embodiments, the pillars 20(a), 20(b) may have an aspect ratio of greater than about 0.25 or more (e.g., 0.25 to 40). In other embodiments, the aspect ratio of the pillars may be about 1.0 or more. The aspect ratio may be defined as the ratio of the height H of each pillar to the smallest width W of the pillar. Preferably, the height of each pillar may be greater than about 1 micron. For example, the height of each pillar may range from about 1 to 10 microns, or from about 10 to about 200 microns. Each pillar may have any suitable width including a width of less than about 0.5 mm (e.g., 100 microns or less).

Figure 2B:
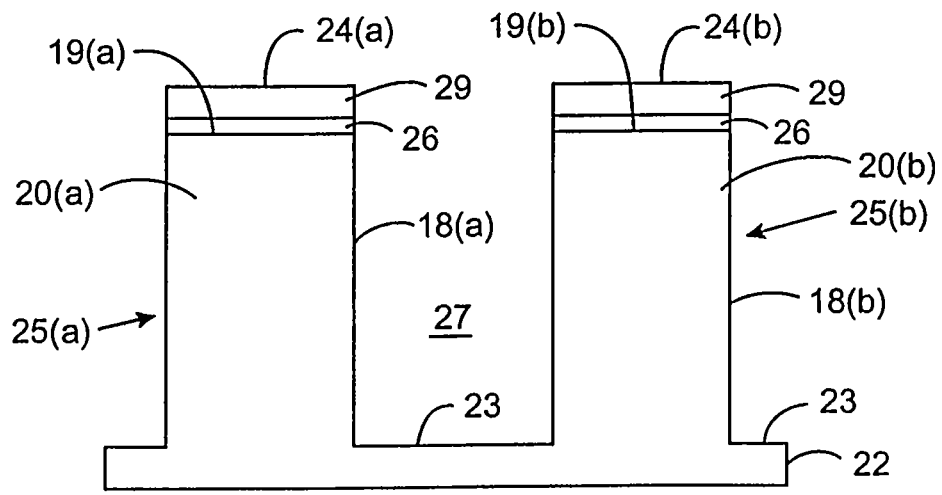

The device depicted in FIG. 2(a) or 2(b) in some cases can also serve as an analyte detection device. This detection device comprises a substrate and a plurality of pillars attached to the surface of the substrate. Each of the pillars comprises a sample surface 24(a) or 24(b) and side surfaces 18(a) or 18(b). In some embodiments, each of the side surfaces 18(a) or 18(b) is perpendicular to the surface of the substrate 23, and the sample surface of each pillar and the surface of the substrate have the same coating.

Discrete volumes of liquid and can be present on the sample surfaces 24(a), 24(b) of the pillars 20(a), 20(b), respectively. The liquid samples may be deposited on the sample surfaces 24(a), 24(b) in any suitable manner and with any suitable dispenser (not shown). The dispenser may include one or more passive valves within the fluid channels in the dispenser. Dispensers with passive valves are described in greater detail below.

The liquid samples may contain components (e.g., analytes, targets, capture agents) that are to be analyzed, reacted, or deposited on the sample surfaces 24(a), 24(b). Alternatively or additionally, the liquid samples may contain components that are to be deposited on the surfaces of the pillars 20(a), 20(b) for subsequent analysis, assaying, or processing. For example, the liquid samples on the pillars 20(a), 20(b) can comprise proteins. The proteins in the liquid samples may bind to the sample surfaces 24(a), 24(b). The proteins on the sample surfaces 24(a), 24(b) can then be analyzed, processed, and/or subsequently assayed, or used as capture agents for capturing analytes.

The liquid samples on the adjacent sample surfaces 24(a), 24(b) are separated from each other by the depression 27 between the adjacent structures. If, for example, a liquid sample flows off of the sample surface 24(a), the liquid sample flows into the depression 27 between the adjacent structures without contacting and contaminating the sample on the adjacent sample surface 24(b). To help retain the samples on the sample surfaces 24(a), 24(b), the side surfaces 18(a), 18(b) of the pillars 20(a), 20(b) may be rendered liquiphobic or may be inherently liquiphobic. For example, the side surfaces 18(a), 18(b) may be coated with a hydrophobic material or may be inherently hydrophobic. In other embodiments, the side surfaces 18(a), 18(b) of the pillars may also be coated with a material (e.g., alkane thiols or polyethylene glycol) resistant to analyte binding. The non-sample surface 23 may also be resistant to analyte binding or may be liquiphobic, or may consist partially or fully of the same material as the sample surfaces 24(a), 24(b).

In some embodiments, the pillars may have one or more channels that surround, wholly or in part, one or more pillars on the base. Examples of such channels are discussed in U.S. patent application Ser. No. 09/353,554 which is assigned to the same assignee as the present application and which is herein incorporated by reference in its entirety for all purposes. This U.S. patent application also discusses surface treatment processes and compound display processes that can be used in embodiments of the invention.

The top regions of the sample structures 25(a), 25(b) may include one or more layers of material. For example, FIG. 2(b) shows a cross-sectional view of a chip with pillars 20(a), 20(b) having a first layer 26 and a second layer 29 on the top surfaces 19(a), 19(b) of the pillars 20(a), 20(b). In this example, the sample surfaces 24(a), 24(b) of the structures 25(a), 25(b) may correspond to the upper surface of the second layer 29. In some embodiments, the top regions of the structures 25(a), 25(b) may be inherently hydrophilic or rendered hydrophilic. As explained in further detail below, hydrophilic surfaces are less likely to adversely affect proteins that may be at the top regions of the structures 25(a), 25(b).

The first and the second layers 26, 29 may comprise any suitable material having any suitable thickness. The first and the second layers 26, 29 can comprise inorganic materials and may comprise at least one of a metal or an oxide such as a metal oxide. The selection of the material used in, for example, the second layer 29 (or for any other layer or at the top of the pillar) may depend on the molecules that are to be bound to the second layer 29. For example, metals such as platinum, gold, and silver may be suitable for use with linking agents such as sulfur containing linking agents (e.g., alkanethiols or disulfide linking agents), while oxides such as silicon oxide or titanium oxide are suitable for use with linking agents such as silane-based linking agents. The linking agents can be used to couple entities such as capture agents to the pillars.

Illustratively, the first layer 26 may comprise an adhesion metal such as titanium and may be less than about 5 nanometers thick. The second layer 29 may comprise a noble metal such as gold and may be about 100 to about 200 nanometers thick. In another embodiment, the first layer 26 may comprise an oxide such as silicon oxide or titanium oxide, while the second layer 29 may comprise a metal (e.g., noble metals) such as gold or silver. Although the example shown in FIG. 2(b) shows two layers of material on the top surfaces 19(a), 19(b) of the pillars 20(a), 20(b), the top surfaces 19(a), 19(b) may have more or less then two layers (e.g., one layer) on them. Moreover, although the first and the second layers 26, 29 are described as having specific materials, it is understood that the first and the second layers 26, 29 may have any suitable combination of materials.

The layers on the pillars may be deposited using any suitable process. For example, the previously described layers may be deposited using processes such as electron beam or thermal beam evaporation, chemical vapor deposition, sputtering, or any other technique known in the art.

In embodiments of the invention, an affinity structure may be on a pillar, alone or in combination with other layers. For example, the affinity structure may be on an oxide or metal layer on a pillar or may be on a pillar without an intervening layer. Preferably, the affinity structure comprises organic materials. In some embodiments, the affinity structure may consist of a single layer comprising molecules that are capable of binding to specific analytes (e.g., proteins). For instance, the affinity structure may comprise a single layer of capture agents that are bound to the surface of, for example, a metal or oxide layer on a pillar. The capture agents may comprise, for example, antibodies, antibody fragments, polypeptides, receptors, DNA strands, fragments, RNA strands or fragments, aptamers, etc. The capture agents can bind to components in a liquid medium through a covalent or a non-covalent mechanism. The affinity structure (and the elements of the affinity structure) can be used to increase the spacing between a top surface (e.g., a silicon surface) of a pillar and a protein that is attached to the top surface of the pillar. The spacing can decrease the likelihood that the attached protein might become deactivated by, for example contacting a solid surface of the sample structure.

In other embodiments, the affinity structure may comprise an organic thin film, affinity tags, adaptor molecules, and capture agents, alone or in any suitable combination. When any of these are used together, the organic thin film, affinity tags, adaptor molecules, and the capture agents may be present in two or more sublayers in the affinity structure. For example, the affinity structure may include three sublayers, each sublayer respectively comprising an organic thin film, affinity tags, and adaptor molecules.

The organic thin film, affinity tags, and adaptor molecules may have any suitable characteristics. An "organic thin film" is a normally a thin layer of organic molecules that is typically less than about 20 nanometers thick. Preferably, the organic thin film is in the form of a monolayer. A "monolayer" is a layer of molecules that is one molecule thick. In some embodiments, the molecules in the monolayer may be oriented perpendicular, or at an angle with respect to the surface to which the molecules are bound. The monolayer may resemble a "carpet" of molecules. The molecules in the monolayer may be relatively densely packed so that proteins that are above the monolayer do not contact the layer underneath the monolayer. Packing the molecules together in a monolayer decreases the likelihood that proteins above the monolayer will pass through the monolayer and contact a solid surface of the sample structure. An "affinity tag" is a functional moiety capable of directly or indirectly immobilizing a component such as a protein. The affinity tag may include a polypeptide that has a functional group that reacts with another functional group on a molecule in the organic thin film. Suitable affinity tags include avidin and streptavidin. An "adaptor" may be an entity that directly or indirectly links an affinity tag to a pillar. In some embodiments, an adaptor may provide an indirect or direct link between an affinity tag and a capture agent. Alternatively or additionally, the adaptor may provide an indirect or direct link between the pillar and, an affinity tag or a capture agent. The capture agent is preferably capable of capturing a protein from a liquid sample. In yet other embodiments, an adaptor may bind directly to a pillar or a layer on a pillar, and may be capable of binding to a component such as an analyte in a liquid sample. An example of a suitable adaptor is biotin. Other examples of organic thin films, affinity tags, adaptors, and capture agents are described in U.S. patent application Ser. Nos. 09/115,455, 09/353,215, and 09/353,555, which are herein incorporated by reference in their entirety for all purposes, and are assigned to the same assignee as the present application. These U.S. patent applications describe various layered structures that can be on the pillars in embodiments of the invention.

The use of an affinity tag provides several advantages. For example, an affinity tag can confer enhanced binding or reaction of the protein with an underlying organic thin film. Proteins, for instance, can be immobilized in a manner that does not require harsh reaction conditions that are adverse to protein stability or function.

The affinity structures and their sublayers may be formed using any suitable process including, for example, chemisorption, physisorption or chemoselective ligation processes. The materials of the sublayers may be bound to the other sublayer materials, the pillars, or layers on the pillars by a covalent or a non-covalent bonding mechanism.

Figure 3:
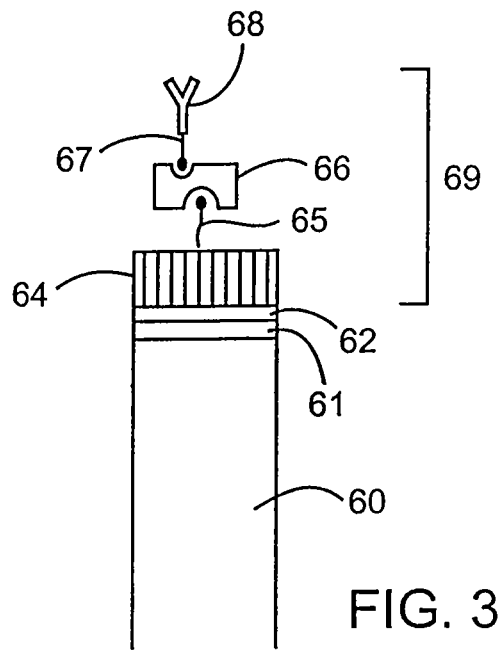
FIGS. 3 and 4 show cross-sectional views of pillars with affinity structures.
Figure 4:
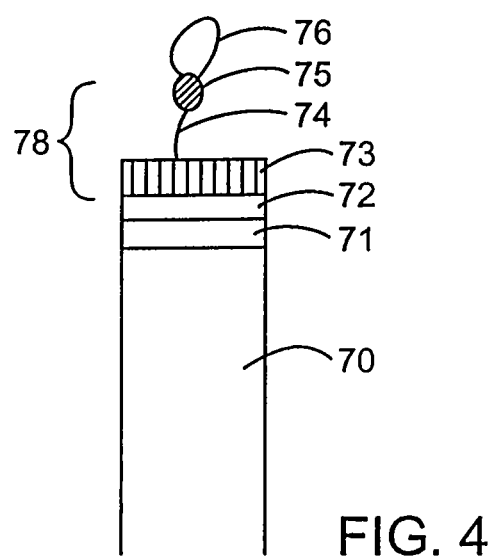

Examples of chip structures having affinity structures on the pillars are shown in FIGS. 3 and 4. FIG. 3 shows a cross-sectional view of a sample structure having an elevated sample surface. The sample structure includes a pillar 60. An interlayer 61 including an oxide such as silicon oxide is at the top surface of the pillar 60. The interlayer 61 may be used to bind the coating layer 62 to the pillar 60. The coating layer 62 may include another oxide such as titanium oxide. An affinity structure 69 is on the coating layer 62. The affinity structure 69 may include a monolayer 64 with organic molecules such as polylysine or polyethylene glycol. In some embodiments, the molecules in the monolayer 64 are linear molecules that may be oriented generally perpendicular to, or at an angle with, the surface of the coating layer 62. Each of the organic molecules in the monolayer 64 may have functional groups at both ends to allow the ends of the molecules to bind to other molecules. A set of molecules including a first adaptor molecule 65 such as biotin, an affinity tag 66 such as avidin or streptavidan, a second adaptor molecule 67 such as biotin, and a capture agent 68 such as an antibody are linked together. The set of molecules is bound to the monolayer 64. In this example, the capture agent 68 is adapted to receive and capture an analyte in a liquid sample that is on the pillar 60. For simplicity of illustration, only one set of molecules is shown in FIG. 3. However, it is understood that in embodiments of the invention, many such sets of molecules may be present on the monolayer 64.

The embodiment shown in FIG. 3 has an affinity structure that has a number of sublayers. The affinity structures used in other embodiments of the invention may include more or less sublayers. For example, FIG. 4 shows a cross-sectional view of another sample structure having an affinity structure with fewer sublayers. The structure shown in FIG. 4 includes a pillar 70. An interlayer 71 including a material such as silicon dioxide is at the top surface of the pillar 70. A coating layer 72 including, for example, a metal oxide (e.g., titanium oxide) may be on the interlayer 71. An affinity structure 78 may be on the coating layer 72. The affinity structure 78 may include a monolayer 73, an affinity tag 74, and an adaptor molecule 75. The affinity tag 74 may be on the monolayer 73 and may couple the adaptor molecule 75 to the monolayer 73. The adaptor molecule 75 may in turn bind an analyte 76 such as a protein to the affinity tag 74.

The affinity structure components separate the sample surface from the top surface of the pillar. As noted above, proteins may deactivate when they come into contact with certain solid surfaces. The affinity structure may serve as a barrier between the pillar and any components in a liquid sample that are to be captured. This reduces the possibility that the top surface of the pillar may deactivate proteins in a liquid sample on the pillar. As shown in FIGS. 3 and 4, for example, the bound analyte 76 and the bound capture agent 68 are not in likely to contact a solid surface (e.g., the solid surfaces of the coating layers 62, 72). Consequently, the presence of the affinity structure 69, 78 decreases the likelihood that contact sensitive molecules such as proteins will be adversely affected by contact with a solid surface. To further reduce this possibility, the materials of the affinity structure may contain materials that are less likely to inactivate proteins.

Figure 5:
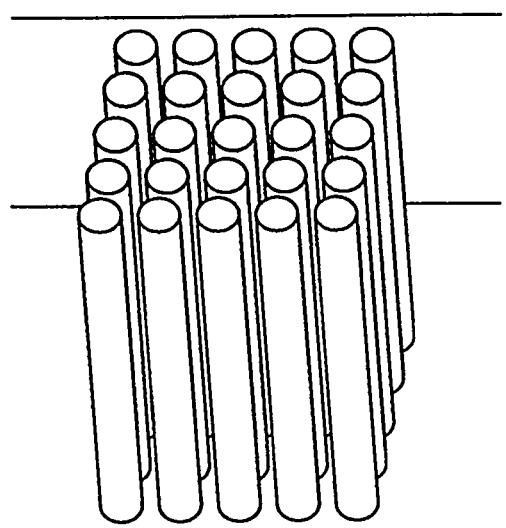
FIG. 5 shows a perspective view of an array of pillars.

The pillars may be present in an array on a base of the chip. An example of an array of pillars is shown in FIG. 5. The pillar array may be regular or irregular. For example, the array may have even rows of pillars forming a regular array of pillars. The density of the pillars in the array may vary. For example, the density of the pillars may be about 25 pillars per square centimeter or greater (e.g., 10,000 or 100,000 per $cm^2$ or greater). Although the chips may have any suitable number of pillars, in some embodiments, the number of pillars per chip may be greater than 10, 100, or 1000. The pillar pitch (i.e., the center-to-center distance between adjacent pillars) may be 500 microns or less (e.g., 150 microns).

Figure 6A:
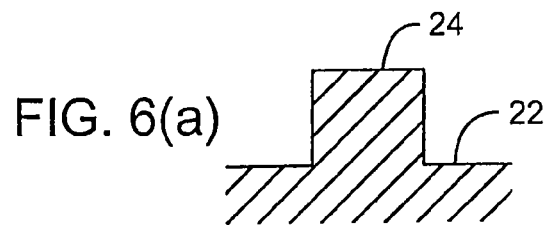
FIGS. 6(a) to 6(b) show cross-sections of pillars.
Figure 6B:
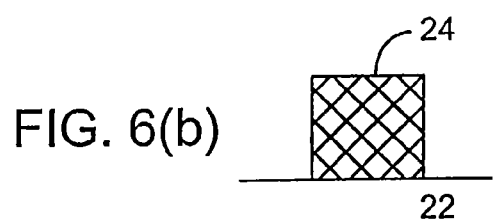
Figures 6C, 6D:
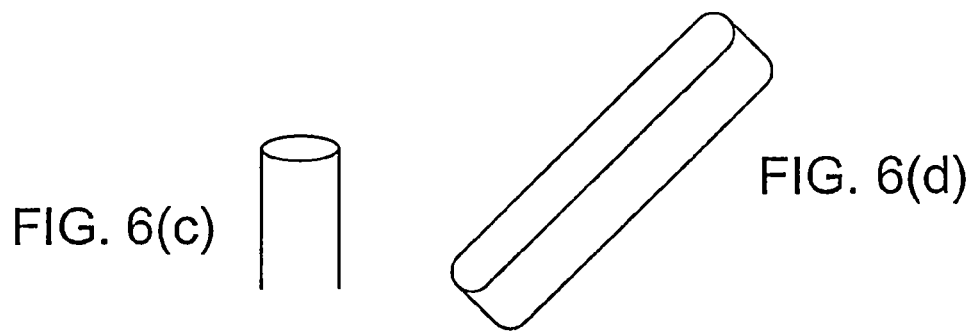
FIGS. 6(c) to 6(h) show perspective views of different types of pillars that may be on a base of a chip.
Figures 6E, 6F:
Figures 6G, 6H:
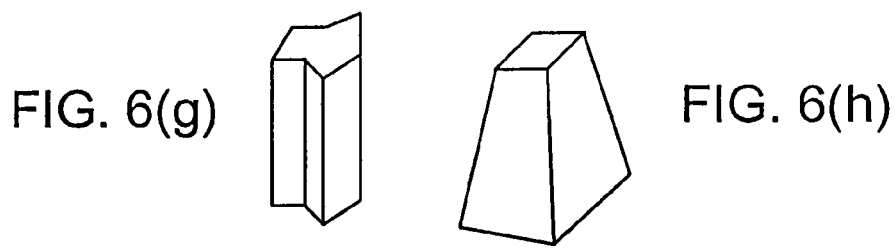
Figure 6I:
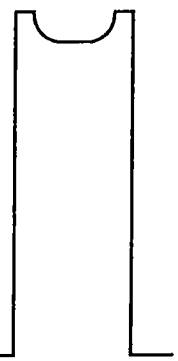

FIGS. 6(a)-6(b) show cross-sections of some pillar embodiments. FIG. 6(a) shows a pillar 24 that is integrally formed with respect to an underlying base 22. In such embodiments, the base 22 may consist of the same material as the pillar 24. FIG. 6(b) shows a pillar 24 that is on a base 22. The pillar 24 may include, for example, a porous material such as a hydrogel material. In embodiments of the invention, all, part, or parts of the pillar may be similarly or differently porous (e.g., may have the same or different degree of porosity). For instance, different strata within a pillar may be porous and can have different properties. By using a porous material, liquid samples can pass into the porous material, and the pillar 24 can hold more liquid sample than would be possible if the pillar 24 was non-porous. Consequently, more liquid sample can be present in a porous pillar than on a non-porous pillar of similar cross-sectional dimensions.

Other suitable pillar shapes are shown in FIGS. 6(c) to 6(k). The embodiment shown in FIG. 6(i) includes a depression at the top portion of the pillar. In this embodiment, the sample surface may lie below the topmost portion of the pillar.

Figure 6J:
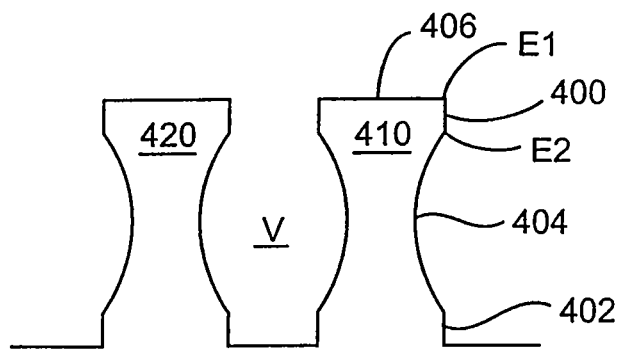
Figure 6K:
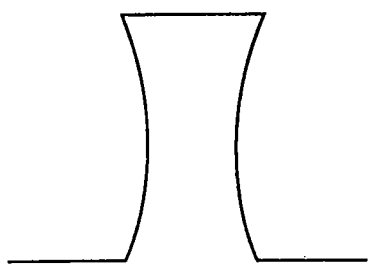
Figure 6I:
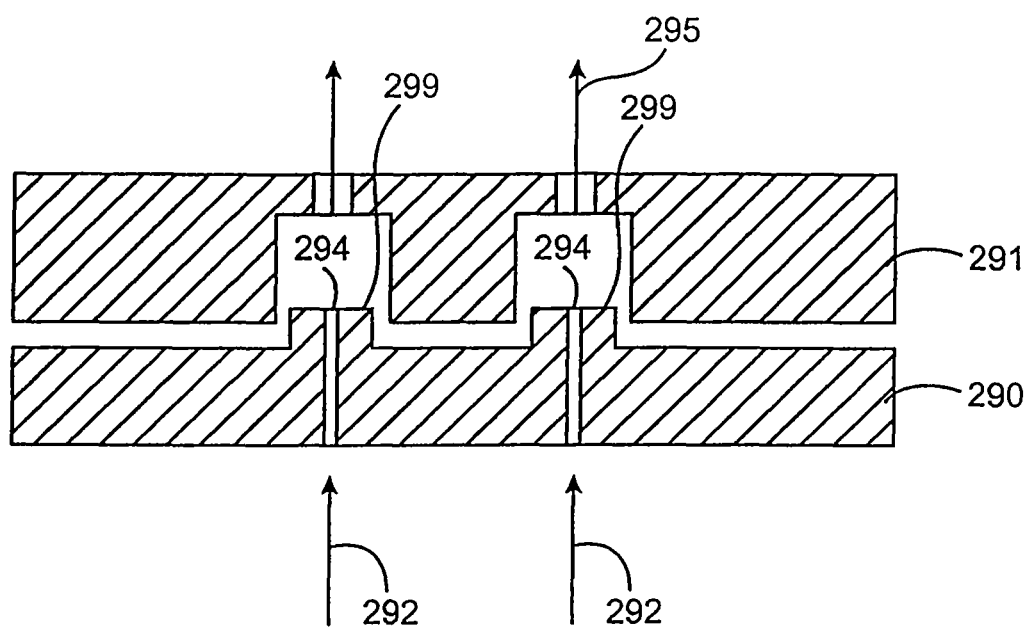
Figure 14:
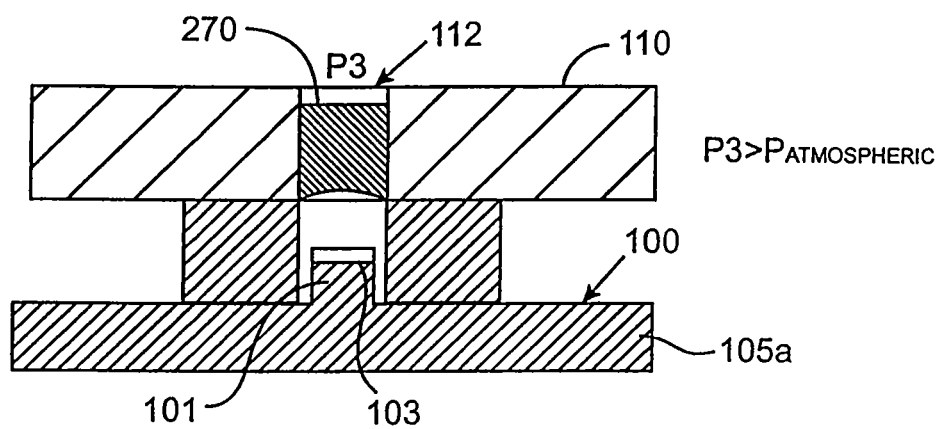
FIG. 14 shows a cross-sectional view of an assembly embodiment.

FIGS. 6(j) and 6(k) show pillars with concave portions. In the embodiment shown in FIG. 6(j), each of the pillars 410, 420 has two non-concave portions 400, 402, one portion 400 near the top and one portion 402 near the bottom. In this example, the side surface of each non-concave portion 400, 402 is substantially perpendicular to the top surface 406 of the pillar. A concave portion 404 lies between the two non-concave portions 400, 402. Each pillar includes abrupt changes in geometry where the concave portion 404 begins and ends. The concave portions 400, 402 may be formed using, for example, a reactive ion etch process. FIG. 6(k) shows a pillar with a concave side surface that begins at the top surface of the pillar and ends at the bottom surface of the pillar.

Using pillars with concave portions and abrupt structural changes can be advantageous. For example, by providing concave portions to the pillars, more empty space is provided in the regions between adjacent pillars. For example, referring to FIG. 6(*i*), the volume V between the adjacent pillars 410, 420 can be used to contain any liquid sample that may flow off of the sample surfaces of the pillars 410, 420. The volume V between adjacent pillars 410, 420 with concave portions is greater than the volume between adjacent pillars having substantially parallel side surfaces (compare, e.g., the pillars shown in FIG. 6(*a*)). Consequently, more space is provided to contain any liquids that may inadvertently flow off of the sample surfaces of the pillars. Moreover, the upper non-concave portion 400 of the pillar 410 shown in FIG. 6(*j*) has two structurally distinct edges E1, E2. As will be explained in further detail below, when pillars with abrupt structural changes (e.g., in FIG. 6(*j*)) are used, these structural changes can form two passive valves when used in conjunction with a dispenser with a cooperatively structured fluid channel. The two passive valves help to prevent a liquid sample from flowing down the sides of the pillars 410, 420. Furthermore, if a liquid sample flows off of the sample surface on the pillar, the concave surface of the pillar can provide a path for the liquid sample to flow inwardly and away from an adjacent sample surface. This also reduces the likelihood of potential liquid cross-contamination between adjacent sample surfaces.

In some embodiments, fluid passages may also be provided in the pillars of the chip. For example, FIG. 6(*l*) shows pillars 299 on a base 290. A fluid passage 294 extends through both the base 290 and the pillars 299. A fluid 292 such as a gas may pass through the fluid passages 294 toward the sample surfaces on the pillars 299 to remove substances from the sample surfaces. A cover chip 291 with corresponding apertures may be placed over the fluid passages 294 in the pillar 299 so that the apertures are over the sample surfaces. Gas may flow through the fluid passages 294 to carry processed samples 295 on the upper surfaces of the pillars 299 to an analytical device such as a mass spectrometer.

In a typical process of using the assembly shown in FIG. 6(*l*), liquids from a dispenser (not shown) may contact the sample surfaces on the pillars of a sample chip. The liquids may process substances on the sample surfaces on the pillars. For example, the liquids may comprise reagents that process proteins on the sample surfaces. After processing, the chip is separated from the dispenser, and the cover chip 291 is placed on the sample chip with the pillars 299. The apertures of the cover chip 291 are respectively over the sample surfaces, and gas flows through fluid passages 294 that extend through the pillars 299. The gas removes the processed substances from the sample surfaces and carries the processed substances through the apertures in the cover chip 291 and to an analysis device such as a mass spectrometer.

The sample chip shown in FIG. 6(*l*) can be used in other ways. For example, in other embodiments of the invention, liquids may also pass upwards through the fluid passages 294 and deposit on the sample surfaces of the sample chip (i.e., on the pillars). In yet other embodiments, the fluid passages 294 can be used to keep components at the sample surfaces hydrated. Hydrating gases or liquids (e.g., water) can pass through the fluid passages 294 to keep any components on the sample surfaces hydrated. For example, by keeping proteins on the sample surfaces hydrated, the proteins are less likely to denature. In some embodiments, the fluid passages 294 may be coupled to a sub-strata porous region of the pillar, useful, for example, to act as a liquid reservoir to supply liquid to the sample surface.

The pillars of the chip may be fabricated in any suitable manner and using any suitable material. For example, an embossing, etching or a molding process may be used to form the pillars on the base of the chip. For example, a silicon substrate can be patterned with photoresist where the top surfaces of the pillars are to be formed. An etching process such as a deep reactive ion etch may then be performed to etch deep profiles in the silicon substrate and to form a plurality of pillars. Side profiles of the pillars may be modified by adjusting process parameters such as the ion energy used in a reactive ion etch process. If desired, the side surfaces of the formed pillars may be coated with material such as a hydrophobic material while the top surfaces of the pillars are covered with photoresist. After coating, the photoresist may be removed from the top surfaces of the pillars. Processes for fabricating pillars are well known in the semiconductor and MEMS (microelectromechanical systems) industries.

Other embodiments of the invention are directed to dispenser assemblies. The dispenser assemblies according to embodiments of the invention may include a sample chip and a dispenser that can dispense one or more fluids on the sample surfaces of the chip. In some embodiments, a plurality of liquids may be supplied to the fluid channels in a dispenser. The liquids supplied to the different fluid channels may be the same or different and may contain the same or different components. For example, each of the liquids in respective fluid channels may include different analytes to be processed. In another example, the liquids in respective fluid channels may contain different capture agents to be coupled to the pillars of the sample chip. The dispenser may provide liquids to the sample surfaces in parallel.

The dispenser may have any suitable characteristics, and can be positioned above the sample chip when liquids are dispensed onto the sample chip. Pressure may be applied to the liquids to dispense the liquids. To control liquid flow, the dispenser may include passive or active valves. In some embodiments, the dispensers have at least one passive valve per fluid channel. In some embodiments, the dispensers may be in the form of a chip with a plurality of fluid channels. In these embodiments, each of the fluid channels can have an end that terminates at a bottom face of the dispenser chip. The dimensions of the fluid channels in the dispenser may vary. For example, a cross-sectional dimension of a fluid channel in the dispenser may be between about 1.0 to about 500 microns (e.g., about 1.0 to about 100 microns).

The dispensers used in embodiments of the invention may be made using any suitable process know in the art. For example, the dispenser may be made, for example, by a 3-D stereo lithography, mechanical drilling, ion etching, or a reactive ion etching process.

In some dispenser assembly embodiments, the sample structures of the chip may be cooperatively structured to fit into fluid channels in a dispenser. The sample structures and their corresponding sample surfaces may be aligned with the fluid channels. After aligning, the sample surfaces may be positioned in the fluid channels or at the ends of the fluid channels. Fluids in the fluid channels may then contact the sample surfaces of the structures. For example, pressure (e.g., caused by pneumatic forces, electrophoretic or electrowetting forces) may be applied to a liquid in a fluid channel so that the liquid flows and contacts the sample surface in the fluid channel. In other embodiments, the distance between the sample surface and the liquid in a fluid channel may decrease until they contact each other. The chip and/or the dispenser may move toward each other to decrease the spacing between the sample surface and the liquid in the fluid channel. In these embodiments, pressure may or may not be applied to the liquid in the fluid channel.

The fluid channels in the dispenser may serve as reaction chambers (or interaction chambers) that can house respectively different interactions such as reactions or binding events. Each sample surface and the walls of a corresponding fluid channel may form a reaction chamber. In a typical assembly, each individual reaction chamber may house a different event (e.g., a different reaction or binding event). In other embodiments, the different reaction chambers may house the same types of events.

Illustratively, a dispenser may provide liquids to the sample surfaces of the chip structures. The liquids may contain molecules that may or may not interact with molecules bound to the sample surfaces of the chip. First, the sample structures containing the sample surfaces may be aligned with the fluid channels. After aligning, the sample surfaces may be inserted into or positioned proximate to the fluid channels. While the sample surfaces are in or proximate to the fluid channels, the liquids in the fluid channels of the dispenser flow and contact the sample surfaces. This allows the molecules bound to the sample surfaces and the molecules in the liquids to react or interact with each other in a nearly closed environment. The interactions or reactions can take place minimizing the exposure of the liquid samples on the sample surfaces to a gaseous environment such as air. Consequently, the likelihood that the liquid samples will evaporate is reduced. After a predetermined time has elapsed, the sample surfaces may be withdrawn from the fluid channels, and/or the chip and the dispenser may be separated from each other. The sample surfaces of the chip can then be rinsed. Products of the reactions or interactions may remain on the sample surfaces. The products at the sample surfaces may then be analyzed to determine, for example, if a reaction has taken place. Alternatively or additionally, the products on the sample surfaces may be further processed or may be separated from the chip and may be transferred downstream of the sample surfaces for further processing or analysis. In other embodiments, the products at the sample surface may be capture agents that can be used to capture analytes in liquids.

Embodiments of the invention may be used to transfer liquids containing capture agents, analytes, etc. to sample surfaces of a chip without forming droplets. For example, a liquid need not pass through a gaseous medium (e.g., air) when it is transferred from a dispenser to the chip. This minimizes the creation of liquid volumes with large surface-to-volume ratios. In embodiments of the invention, small volumes of liquids may be transferred to a chip and processed on the chip while minimizing alterations (e.g., protein denaturing) of components in the transferred liquids.

Some assembly embodiments may be described with reference to FIGS. 7 to 9. FIG. 7 shows a dispenser 110 and FIG. 8 shows a chip 105. The chip 105 includes a plurality of pillars 101 on a base 105a. Each pillar 101 has a top sample surface 103 and a side surface 104. The sample surface 103 is elevated with respect to a non-sample surface of the base 105a.

The dispenser 110 includes a body 111 having at least one fluid channel 112 defined in the body 111. In this example, the fluid channels 112 are substantially vertical. As noted above, the fluid channels 112 may define reaction chambers that can house chemical or biological reactions or interactions. At least a portion of the fluid channels 112 may be oriented in a z direction with respect to an x-y plane formed by the body 111 of the dispenser 110. In this example, the fluid channels 112 illustrated in FIG. 7 are vertical and have one end terminating at an upper surface of the body 111 and the other end terminating at a lower surface of the body 111.

In other dispenser embodiments, the fluid channels 112 may have horizontal and vertical portions. For example, one end of a fluid channel may originate at an upper surface of the body and may pass horizontally across the upper surface of the body. At some predetermined point on the body, the orientation of the fluid channel changes from a horizontal orientation to a vertical orientation and terminates at a lower surface of the body of the dispenser. Moreover, although the number of fluid channels 112 in the dispenser is shown to be equal to the number of pillars 101 in the assembly shown in FIGS. 7 and 8, the number of fluid channels and the number of pillars of a chip may be different in other embodiments.

The walls defining the fluid channels 112, as well as a bottom surface 113 of the dispenser 110 may be coated with various materials that influence the behavior of the liquid in the fluid channels 112 (e.g., wetting). For instance, the fluid channel walls may be coated with materials that increase or decrease the interaction between fluid channel walls and the liquids in the fluid channels. For example, the walls defining the fluid channels 112 may be coated with a hydrophilic material. Proteins, for example, are less likely to denature if they come in contact with a hydrophilic surface than with a non-hydrophilic surface.

The fluid channels 112 in the dispenser 110 may be cooperatively structured to receive the pillars 101. For example, as shown in FIG. 8, the pillars 101 of the chip 105 may be insertable into the fluid channels 112 in the body of the dispenser 110. In this regard, the axial cross-sectional area of each of the fluid channels 112 in the dispenser 110 may be greater than the axial cross-sectional area of the pillars 101. When the pillars 101 are inserted into the fluid channels 112 in the dispenser 110, the sample surfaces 103 of the pillars 101 may be within respective fluid channels 112. The volumes defined by the fluid channels 112 and the top surfaces 103 of the pillars 101 may be reaction chambers where reactions can occur.

The chip 105 and the dispenser 110 may each have one or more alignment members so that they can be aligned with each other and the pillars can be aligned with the fluid channels. The alignment members may be alignment marks or alignment structures. Typical alignment structures may be, for example, a pin and a corresponding hole. For instance, the edges of the chip 105 may have one or more pins (not shown) that are longer than the pillars 101. These pins may be inserted into corresponding holes (not shown) at the edges of the dispenser 110 to align the chip 105 and the dispenser 110 and consequently align the pillars 101 with the fluid channels 112. The alignment members may be optical, mechanical, or magnetic. For example, in some embodiments, the alignment members may be high aspect ratio linear channels which permit light passage when, for example, the chip and the dispenser are operatively aligned. Alternatively, a magnetic region may induce a signal in a detector once, for example, the chip and the dispenser are operatively aligned The dispenser assemblies may include one or more passive valves. A passive valve stops the flow of liquid inside or at the end of a capillary using a capillary pressure barrier that develops when the characteristics of the capillary or mini channel changes, such as when the capillary or channel cross-section changes abruptly, or when the materials of structures defining the fluid channels change abruptly. Passive valves are discussed in P. F. Man et al., "Microfabricated Capillary-Driven Stop Valve and Sample Injector," IEEE 11$^{th}$ Annual Int. MEMS Workshop, Santa Clara, Calif., September 1999, pp. 45-50, and M. R. McNeely et al., "Hydrophobic Microfluidics," SPE Conf. on Microfluidic Devices and Systems II, Santa Clara, Calif., September 1999, vol. 3877, pp. 210-220. These publications are herein incorporated by reference for all purposes. Passive valves are unlike active valves which completely close off a fluid channel with a physical obstruction.

In an illustrative example of how an assembly with a passive valve can be used, the structures of a chip can be inserted into respective fluid channels in a dispenser. Each fluid channel can have one, two, or three or more passive valves. For instance, each fluid channel may have a passive valve that is formed by an abrupt structural change in the geometry of a fluid channel. For example, the walls of a fluid channel may form a step structure. When a liquid encounters the step structure at a predetermined pressure, the liquid stops flowing.

Passive valves can also be formed when the structures containing the sample surfaces are within or are positioned at the ends of the fluid channels. For example, a pillar may be inserted into a fluid channel so that there is a space between the side surfaces of the pillar that is in the fluid channel and the fluid channel walls around the pillar. The portion of the fluid channel where the pillar resides may have an annular configuration. As liquid flows towards the pillar, the geometry of the fluid channel changes from a cylindrical configuration to an annular configuration. At a predetermined pressure, the liquid stops flowing at this geometry change. Additional pressure is needed to cause the liquid to flow past this geometry change. Different pressures may be applied to initiate the flow of liquid past each of the passive valves in the fluid channel. For example, two different levels of pressure may be applied to a fluid in a fluid channel to move a liquid past two different passive valves.

In one specific example of an assembly with a dispenser using one or more passive valves, a chip including pillars is used with a dispenser containing a plurality of fluid channels. The pillars may be inserted into the fluid channels and the chip may be brought into contact with the dispenser. Before or after insertion, a first pressure is applied to the liquids in the fluid channels to push the fluid samples to, but not substantially past, the first passive valve. A second pressure is then applied to the fluid samples to push the samples past the first passive valve so that the liquids are in contact with the pillars. The samples do not pass the second passive valve, which is defined by the pillar and the channel walls. After the liquids in the fluid channels contact the sample surfaces, the pressure applied to the liquids is decreased. Then, the dispenser and the chip are separated from each other to separate the sample surfaces from the bulk of the liquids in the fluid channels. In this step, the pillars are withdrawn from the fluid channels and liquid samples may remain on the sample surfaces. Withdrawing the pillars from the fluid channels may stop any events that may be occurring at the sample surfaces. Alternatively, reactions can still occur after the pillars are withdrawn from the fluid channels and reactions can stop after a washing step is performed. After liquid samples are transferred to the sample surfaces, processes such as evaporation and the formation of an air-liquid interface will have little or no adverse effect on the deposited components in the liquid samples. Any residual solvent or material on the sample surface may be rinsed away leaving the desired components on the sample surfaces.

In other embodiments, the structures may be inserted into the fluid channels until contact is made with liquids within respective channels. In these embodiments, added pressure need not be applied to the fluids in the fluid channels to bring the fluids in contact with the sample surfaces of the structures.

The dispensers according to embodiments of the invention have a number of advantages. For instance, unlike conventional ring-pin dispensers, embodiments of the invention can deliver a large number of liquids to the sample surfaces in parallel. For example, in embodiments of the invention, 10,000 or more fluid channels can be used to dispense 10,000 liquid samples. In comparison, conventional ring-pin dispensers may have only about 30 ring pins per assembly. Also, unlike a capillary pin dispenser that can potentially physically touch a sample surface thus potentially damaging the dispenser and the sample surface, many of the described dispenser embodiments do not come in contact with the sample surface. Moreover, unlike many conventional dispensers, the assembly embodiments of the invention can reduce the likelihood of forming an air-liquid interface, since droplets are not formed when liquid is transferred from a dispenser to a chip. As the volume of a drop gets smaller, the surface to volume ratio of the drop gets larger leading to problematic interactions between the molecules in the liquid that are to be transferred to the sample surface and the air-liquid interface of the drop. In embodiments of the invention, droplets of liquid need not be formed, thus minimizing the formation of a liquid sample with a gas/liquid interface with a high surface to volume ratio.

Specific examples of assemblies using passive valves may be described with reference to FIGS. 10-14. Referring to FIGS. 10 and 11, a liquid 270 is placed in the fluid channel 112 in a dispenser 118. A first dispenser portion 120(*a*) may comprise a hydrophilic material and a second dispenser portion 120(*b*) may comprise a hydrophobic material. The fluid channel 112 is then aligned with a pillar 101 on a base 105a of a chip 100 and the pillar 101 is inserted into the fluid channel 112. As shown in FIG. 11, the dispenser 110 and the chip 100 are in contact with each other when the pillar 101 is inserted into the fluid channel 112. Before or after the pillar 101 is inserted into the fluid channel 112, a first pressure is applied to the liquid 270. The first pressure may be greater than atmospheric pressure. The liquid 270 flows to, but not past, a first passive valve 114 defined within the fluid channel 112. The passive valve 114 may be formed by an abrupt change in the cross-sectional area of the fluid channel 112. Alternatively or additionally, the passive valve 114 may be formed by an abrupt change in the material of the fluid channel walls (e.g., hydrophilic to hydrophobic). Regardless of the particular form that the passive valve 114 takes, the passive valve 114 prevents the liquid 270 from flowing out of the fluid channel 112 at the pressure P1.

Referring to FIG. 12, after the pillar 101 is inserted into the fluid channel 112, a pressure P2 may be applied to the liquid 270. The pressure P2 may be greater than the pressure P1. The applied pressure P2 causes the liquid 270 to flow past the first passive valve 114 and onto a material at the top surface 103 of the pillar 101 and to a second passive valve 115 defined by the top surface 103 of the pillar 101 and the surrounding walls of the fluid channel 112.

Referring to FIG. 13, the abrupt change in geometry occurs at a fluid channel region 109 near the top surface 103 of the pillar 101. In this example, this region 109 of the fluid channel 112 has an annular shape due to the presence of the pillar 101. The liquid 270 reacts with the material on the top surface 103 of the pillar 101. Alternatively, the liquid 270 and components in the liquid 270 may simply deposit on the top surface 103 of the pillar 101.

After the liquid 270 is on the top surface 103 of the pillar 101, the majority of the liquid 270 may be separated from the pillar 101. For example, referring to FIG. 14, a pressure less than the pressure P2 (e.g., less than atmospheric pressure) is applied to the liquid 270 so that the bulk of the liquid 270 flows upward while leaving a portion of the liquid 270 on the pillar 101. In other embodiments, the chip 105 and the dispenser 110 may be separated from each other to separate the bulk of the liquid 270 from the liquid deposited on the pillar 101. The pillar 101 may be withdrawn from the fluid channel 112 and the bulk of the liquid 270 may be retained in the fluid channel 112 of the separated dispenser 110. In some embodiments, separation of the pillar 101 from the fluid channel 112 may stop any interaction between the liquid and any material at the top surfaces of the pillar 101. In these embodiments, a pressure less than pressure P2 is not needed to separate the bulk of the fluid 270 from the pillar 101. After the dispenser 110 is separated from the chip, the top surface of the pillar 101 may be rinsed or flushed with another liquid. The rinsing or flushing step can stop any interactions between the liquid and any material at the top surfaces of the pillar 101, if the prior separation of the chip 105 and the dispenser 110 does not stop the interactions taking place.

Figure 15:
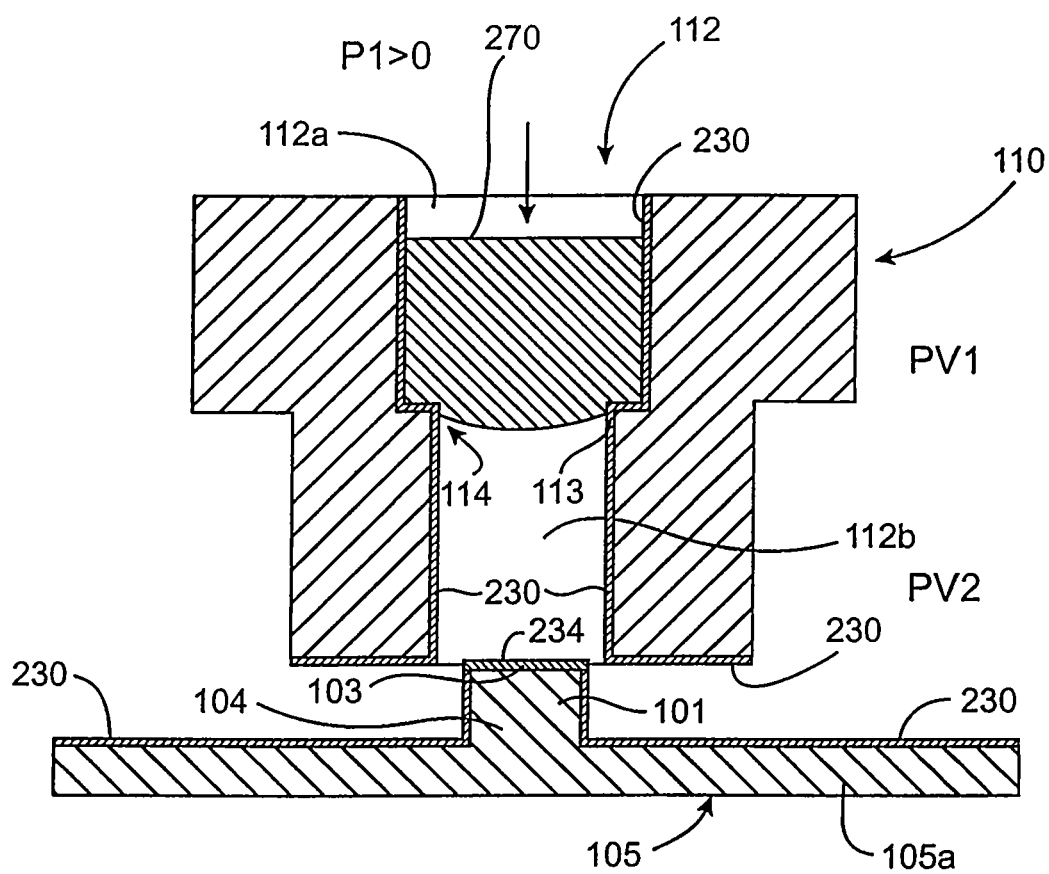
FIGS. 15 to 16 show cross-sectional views of assembly embodiments.

FIG. 15 illustrates an assembly embodiment with a dispenser with a passive valve. The dispenser 110 has a fluid channel 112 having a first channel section 112a communicating with a second channel section 112b. The first channel section 112a is wider than channel section 112b. In this example, both the first channel section 112a and the second channel section 112b terminate in a shoulder 113 which forms a restriction between the first channel section 112a and the second channel section 112b. The restriction (or a preventative means for preventing the flow of liquid 270) functions as a passive valve 114. The internal walls of the channel 112 may have a hydrophobic surface 230. The top surface 103 of the pillar 101 may be a hydrophilic surface 234.

In the embodiment shown in FIG. 15, the liquid 270 may be deposited on the pillar 101 in the same or different manner as the processes described with reference to FIGS. 10-14. For instance, the pillar 101 may be inserted into or positioned at the end (e.g., exactly at the end of the fluid channel or just outside of the end of the fluid channel) of the fluid channel 112 of the dispenser 110. The dispenser 110 may or may not contact the chip 105 during the process of depositing liquid onto the pillar 101. When the flow of liquid 270 is stopped at the first passive valve, the liquid 270 may be at a pressure $P_1$. A second pressure $P_2$, which is greater than the first pressure $P_1$, is subsequently applied to the liquid 270 to force the liquid 270 through and past the first passive valve 114 until it contacts the hydrophilic surface 234 on the pillar 101 that lies within the fluid channel 112. The upper portion of the pillar 101 and the surrounding fluid channel 112 may form a second restriction that forms a second passive valve. Alternatively, the hydrophilic surface 234 on top surface 103 of pillar 101 in combination with the hydrophobic surfaces 230 on the walls of second channel section 112b and on side 104 of pillar 101 functions as the second passive valve. In both instances, the flow of the fluid 270 stops at the upper surface of the pillar 101. The top surface of the chip base 105a may also be a hydrophobic surface 230. The bottom surface of the dispenser 110 may also be a hydrophobic surface 230.

The hydrophilic surface 234 may be produced according to any suitable process and may include any suitable materials. For example, silicon oxide (e.g., $SiO_2$), and polymers terminating in hydrophilic groups (e.g., OH or COOH) may be used to form a hydrophilic surface 234. The hydrophilic surface 234 on top of the pillars 101 may be produced according to procedures disclosed in U.S. patent application Ser. No. 09/115,397, which is assigned to the same assignee as the present invention and is herein incorporated by reference in its entirety for all purposes.

Figure 16:
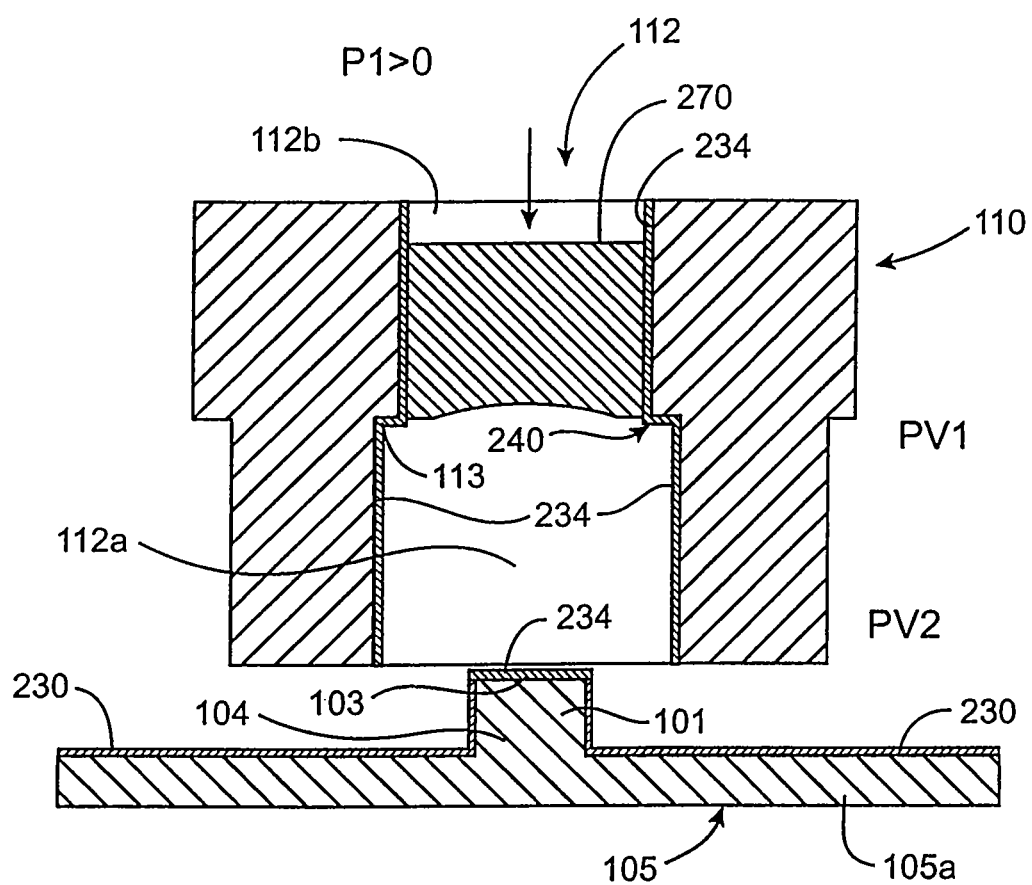

FIG. 16 shows another assembly embodiment. This embodiment is similar to the embodiment shown in FIG. 15. However, in this example, the second channel section 112b is on top of the first channel section 112a and the liquid 270 passes through the second channel section 112b before entering the first channel section 112a. The walls of the channel 112 in this example have the hydrophilic surface 234. A first pressure $P_1$ is applied to the liquid 270 to force the liquid 270 through the second channel section 112b up to, but not past, a first passive valve 240. In FIG. 16, the abrupt enlargement defines the first passive valve 240. The abrupt enlargement is an instantaneous increase of the width of the fluid channel 112 defines a shoulder 113. A second pressure $P_2$, which may be greater than the first pressure $P_1$, is subsequently applied to the liquid 270 to push the liquid 270 through and past the first passive valve 240 until contacting the hydrophilic surface 234 of the pillar 101. The liquid 270 encounters a restriction defined by the pillar 101 when the pillar 101 is in the channel 112. This restriction may function as a second passive valve. Alternatively or additionally, the hydrophilic surface 234 on top surface 103 and on internal wall of first channel section 112a in combination with the hydrophobic surface 230 on the pillar chip 105, including on the sides 104 of the pillar 101 may function as the second passive valve. The restriction prevents the flow of liquid 270 out of fluid channel 112 and onto the pillar chip 105.

FIGS. 17(a) to 17(d) show cross sections of assembly embodiments including a chip with a pillar having a concave side surface. A sequence of steps that may be used to deposit a liquid sample onto a sample surface of a pillar may be described with reference to FIGS. 17(a) to 17(d).

Figure 17A:
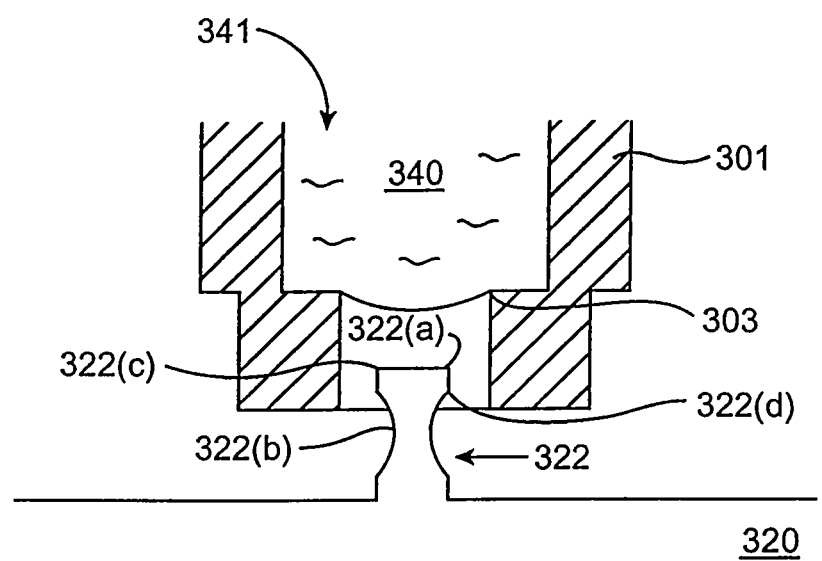
FIGS. 17(a) to 17(d) show cross-sectional views of an assembly embodiment including a chip with a pillar having a concave side surface.

FIG. 17(a) shows a pillar 322 on a base 320 of a chip. The pillar 322 includes a sample surface 322(a) and a side including a concave portion 322(b) between an upper non-concave portion and a lower non-concave portion. A first edge 322(c) and a second edge 322(d) define the upper non-concave portion. A dispenser 301 is above the chip, and a fluid channel 341 in the dispenser 301 is aligned with and is over the pillar 322. A liquid 340 is in the fluid channel 341 and a step structure 303 prevents the liquid 340 from passing to the pillar 322. The step structure 303 may function as a first passive valve that stops the flow of liquid at a pressure P1.

Figure 17B:
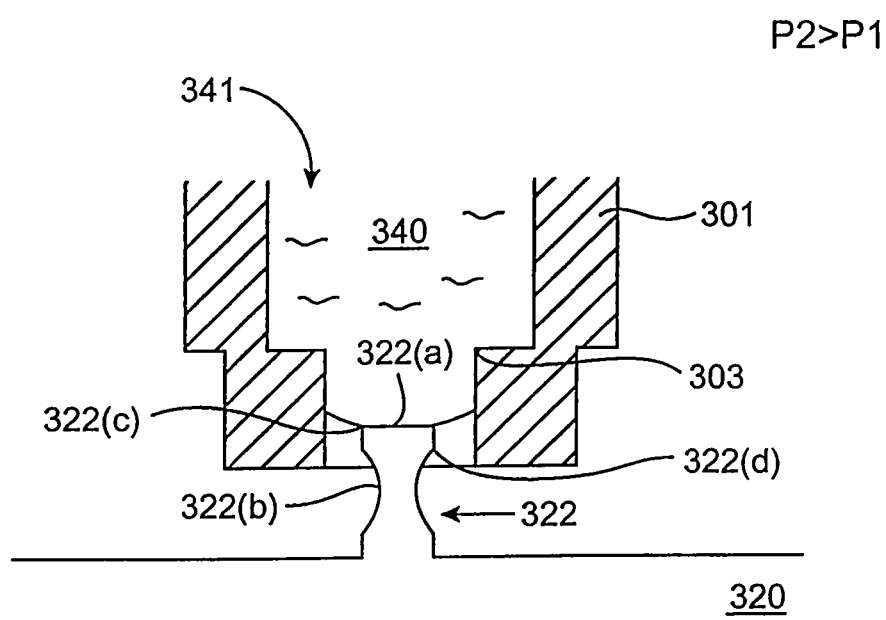

FIG. 17(b) shows the liquid 340 contacting the sample surface 322(a) of the pillar 322. In this example, a pressure P2 is applied to the liquid 340 so that the liquid sample flows past the step structure 303 of the dispenser 301. The pressure P2 in this example is greater than the pressure P1. At the pressure P2, the liquid 340 may flow until it encounters the edge surfaces 322(c), 322(d) of the upper non-concave portion. As shown in FIG. 17(b), the flow of the liquid 340 may stop at the upper edge 322(c) of the pillar. The edge 322(c) and a portion of the wall defining the fluid channel 341 may form a second passive valve that stops the liquid 340 from flowing past the edge 322(c) at the pressure P2.

Figure 17C:
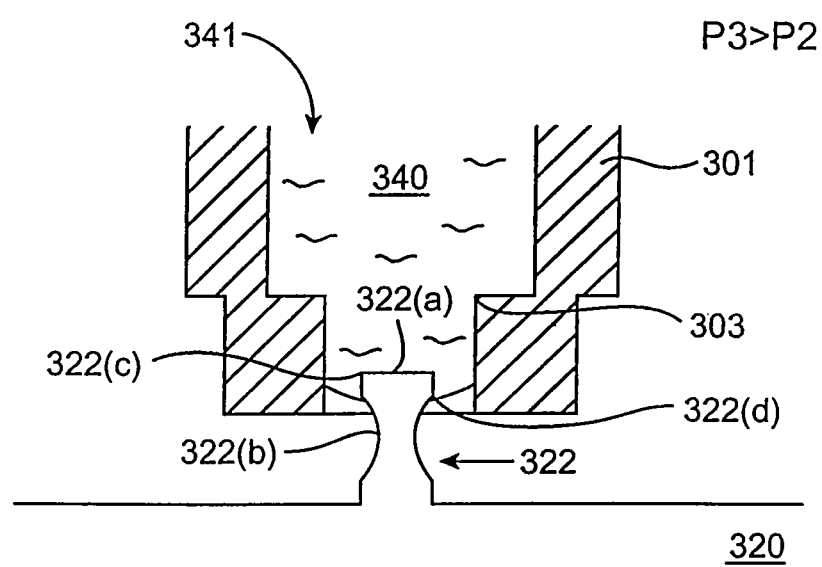

Alternatively or additionally, as shown in FIG. 17(c), the flow of the liquid 340 may stop at the bottom edge 322(d) of the upper non-concave portion of the pillar 322 when the pressure P3 is applied to the liquid 340. The edge 322(d) and the surrounding wall may form a third passive valve that stops the liquid 340 from flowing past the edge 322(d). The pressure P3 may be greater than the pressures P1 and P2. Although pressure is applied to the liquid 340 in the examples shown in FIGS. 17(b) and 17(c), in other embodiments, a higher pressure need not be applied to the liquid 340 to bring the liquid 340 in contact with the sample surface 322(a) of the pillar 322. For instance, the pillar 322 and/or the dispenser 301 may move toward the other until they contact each other.

Accordingly, in some embodiments, the sample surface and a liquid in a fluid channel can contact each other without applying additional pressure to the liquid 340.

Advantageously, the pillar 322 shown in FIGS. 17(b) and 17(c) can, when in a fluid channel, form two passive valves proximate the upper portion of the pillar 322. Having two passive valves instead of one to stop the flow of liquid at the top portion of the pillar 322 helps to ensure that a substantial amount of the liquid 340 does not flow down the sides of the pillar 322. The flow of liquid 340 down the sides of the pillar 322 is further minimized and the likelihood that the liquid sample will flow to an adjacent sample surface is also minimized. This further reduces the likelihood of cross-contamination between samples on different sample surfaces.

Figure 17D:
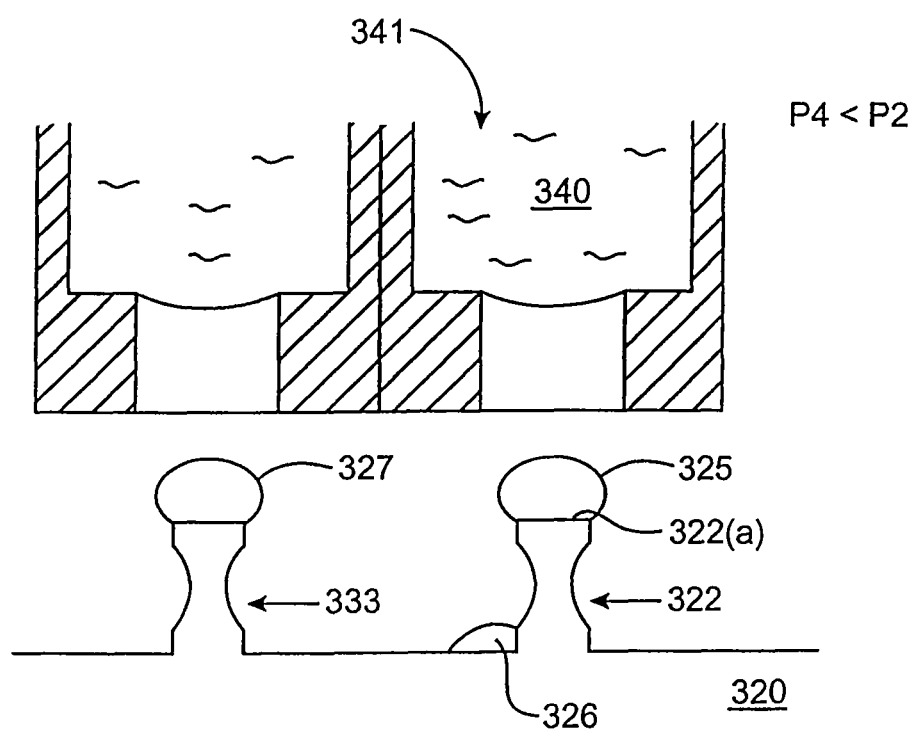

Referring to FIG. 17(d), after the liquid 340 contacts the sample surface 322(a) of the pillar 322, a portion 327 of the liquid 340 may deposit on the sample surface 322(a), while the bulk of the liquid 340 may be separated from the sample surface. This may be accomplished by applying a lower pressure to the liquid 340. For example, a pressure P4, which may be less than the pressures P2 and P3, may be applied to the liquid 340. The lower pressure causes the liquid 340 to flow upward into the fluid channel 341. Alternatively or additionally, the dispenser 301 and the chip may be separated from each other by moving the chip and/or the dispenser away from the other. If a portion 326 of the liquid sample does not deposit on the sample surface, it can flow down a side of the pillar 322 without flowing to a liquid sample 327 on an adjacent pillar 333. Cross-contamination between samples on adjacent surfaces is thus minimized.

Additional details regarding dispenser assemblies and sample chips can be found in U.S. non-provisional application Ser. No. 09/792,335, entitled "Chips With Elevated Sample Surfaces" by Pierre F. Indermuhle et al., now U.S. Pat. No. 6,720,157, which is herein incorporated by reference in its entirety for all purposes.

II. Analysis Assemblies

After analytes or processed analytes are present at the sample surfaces of the sample chip, a microanalysis chip may be interfaced with the sample chip. The microanalysis chip may be used to perform functions including, but not limited to: transferring an analyte or analyte derivatives (e.g., mixture of subunits of an analyte) downstream of the sample surfaces of the sample chip; performing reactions at the sample surfaces of the sample chip (e.g., derivation reactions) or otherwise chemically affecting analytes; concentrating and/or purifying analytes or analyte derivatives in a fluid; performing infusion and/or performing chromatography on a fluid containing analytes or analyte derivatives; and delivering analytes or analyte derivatives to an analysis device such as a mass spectrometer.

Figure 18:
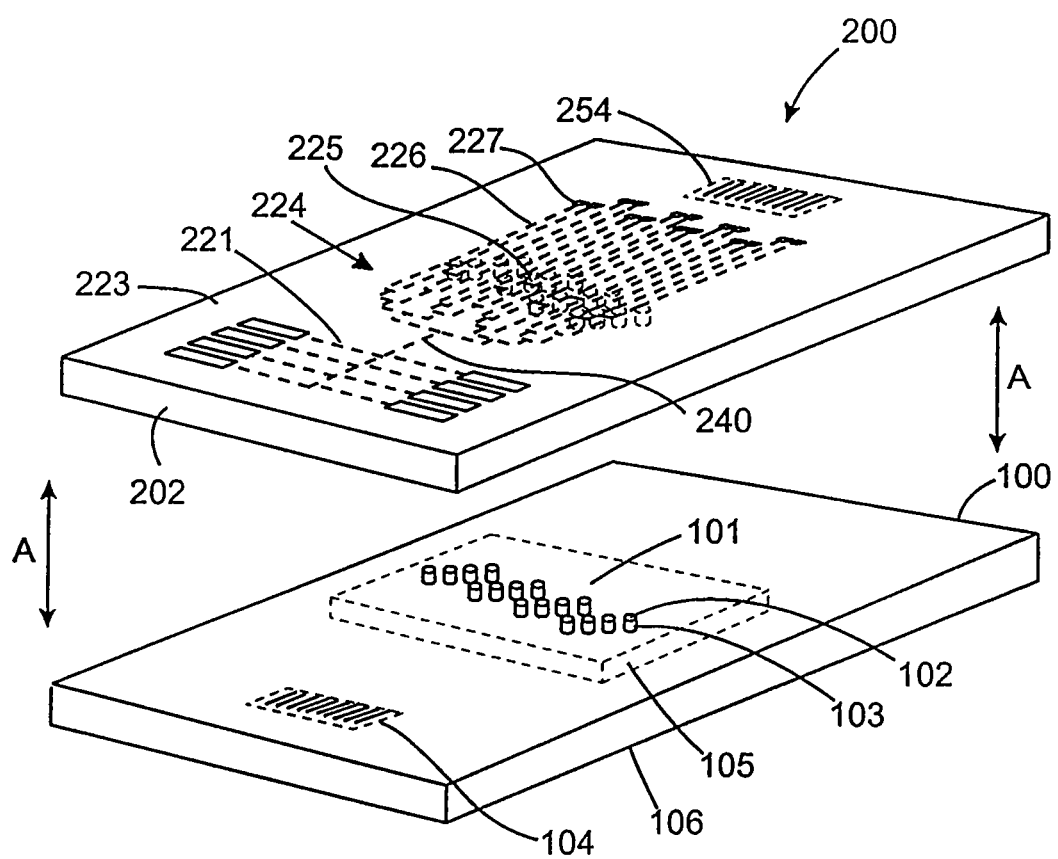
FIG. 18 is a perspective view of a microanalysis chip spaced from a sample chip engaged to a chip holder.
Figure 19:
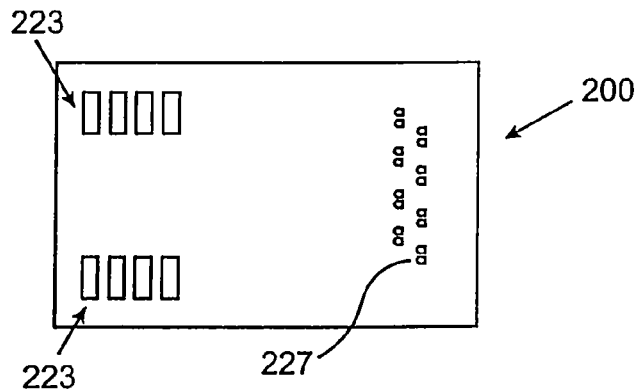
FIG. 19 is a top view of a microanalysis chip.
Figure 20:
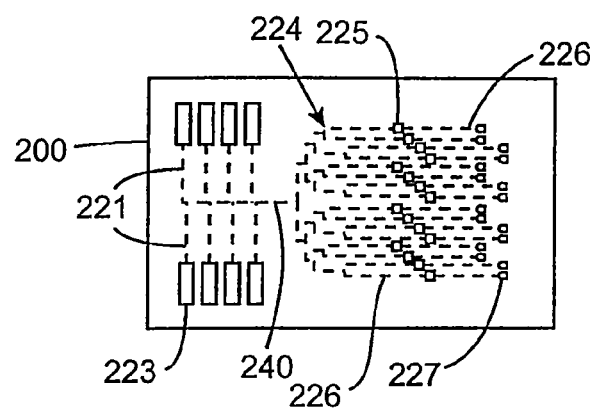
FIG. 20 is a top view of a microanalysis chip with horizontal fluid channels being shown by dotted lines.

FIG. 18 shows an analysis assembly comprising a microanalysis chip 200 over a chip assembly 100. The microanalysis chip 200 can have an identifier such as a bar code 254. Top views of the microanalysis chip 200 are shown in FIGS. 19 and 20. In FIG. 20, the fluid channels in the microanalysis chip 20 are embedded and are shown by dotted lines.

The chip assembly 100 comprises a chip holder 106 and a sample chip 105. The sample chip 105 may be in a cooperatively structured depression in the chip holder 106 so that the upper surfaces of the chip holder 106 and the base of the sample chip 105 are substantially coplanar. The chip assembly 100 and the sample chip 105 may have the same or different characteristics as the previously described sample chips and chip assemblies. For example, the sample chip 105 may include sample structures with pillars 101 with side surfaces 103. Sample surfaces 102 may be on the pillars 101. The chip assembly 100 may also have an identifier such as a bar code 104.

The microanalysis chip 200 may include a body 202 having a plurality of bottom openings that may be in the form of wells 225 defined within the body 202. Specifically, one or more wells 225 may be at the channel bottoms of respective transfer-separation channels 226. The transfer-separation channels 226 may be used to supply fluids to the sample surfaces 103 in the same of different manner as the above-described dispensers and dispenser chips. In some embodiments, the fluids passing through the transfer-separation channels 226 may be used to separate analytes or processed analytes from the sample surfaces 103. The separated analytes may then be transferred downstream of the sample surfaces 103. The wells 225 are coupled to a plurality of reservoirs 223 via a number of delivery channels 221, a common delivery channel 240, and a distribution network 224. The distribution network 224 distributes fluids flowing through the common delivery channel 240 to the wells 225. The distribution network 224 may include the transfer-separation channels 226, and a number of valving and gating elements (not shown) to control the routing of fluids to the desired wells 225.

The wells 225 may have any suitable geometry. For example, the wells 225 may be rectangular or cylindrical and may be cooperatively structured to receive the pillars 101 of the sample chip 105. Each well 225 may also include one or more passive valves. The passive valves in the wells 225 may be the same or different than the passive valves in the fluid channels in the dispensers and the dispenser assemblies described above. Each well 225 may extend from the channel bottom of a transfer-separation channel 226 to a bottom surface of the microanalysis chip 200. Accordingly, the fluids flowing in the transfer-separation channel 226 can be accessed through the bottom of the microanalysis chip 200.

Each transfer-separation channel 226 may include a portion upstream of a well 225 at its channel bottom and a portion downstream of the well 225. The downstream portion of the transfer-separation channels 226 may be in communication with a nozzle 227. The nozzle 227 can discharge a fluid flowing in the transfer-separation channel 226 to an analysis device such as a mass spectrometer. In this regard, the microanalysis chip 200 can have one or more discharge apertures for discharged fluids to pass through. Each nozzle 227 may include a discharge aperture.

In FIGS. 18 and 20, the wells 225, the delivery channels 221, the common delivery channel 240, the distribution network 224, and the transfer-separation channels 226 are shown as dotted lines as they lie underneath the top surface of the microanalysis chip 200. In other embodiments, the fluid channels can be at the top surface of the microanalysis chip 200. For example, a plurality of transfer-separation channels 226 may be defined in the top surface of the microanalysis chip 200 so that they are open fluid channels.

The flow of fluids in the microanalysis chip 200 (or the dispenser chip 110 described above) may be accomplished by any means well known in the art. For example, pumping and valving elements (not shown) may control the flow of fluids through the various fluid channels in the analysis chip 200. In some embodiments, electroosmotic pumping is used to control the flow of fluids in the analysis chip 200. Electrodes (not shown) may be included the reservoirs 223 and at various points in the fluid channels in the analysis chip 200. For clarity of illustration, many of the Figures do not show these electrodes. As known by those of ordinary skill in the art, the electrodes may be biased by applying predetermined potentials to them. The biased electrodes can then control the flow of fluids in the analysis chip 200. The processes for incorporating such electrodes in a microfluidic device are well known in the art. Electroosmotic pumping techniques and other fluid flow control techniques are described in, for example, U.S. Pat. Nos. 5,632,876; 5,750,015; 5,858,188 and 6,007,690. All of these U.S. patents are herein incorporated by reference for all purposes.

The flow of fluids in the fluid channels in the microanalysis chip may also be controlled by providing the fluid channels with a predetermined configuration or geometry. For example, when fluids are to be delivered at a similar rate, the fluid channels may have the same dimensions and may be parallel. In another example, if the fluids are to move faster in a particular fluid channel the size of the fluid channel can be decreased relative to the size of other fluid channels. The flow of fluids in the microanalysis chip can be controlled in other ways. For example, external pressure or vacuum may be applied to the fluids in the fluid channels to control the flow of the fluids.

An illustrative use of the dispenser assembly can be described with reference to FIG. 18. After analytes are present at the sample surfaces 103 of the sample chip 105, the sample chip 105 is subsequently interfaced with the microanalysis chip 200 where a number of operations can be performed. For instance, fluids such as liquid reagents may be delivered to the sample surfaces 103 of the sample chip 105 in one or more procedures to process analytes at the sample surfaces 103. For example, reagents may be delivered to the sample surfaces 103 to purify and concentrate intact analytes or processed analytes (e.g., mixtures of peptide subunits) on the sample surfaces 103 prior to infusion or chromatographic separation of the analytes or processed analytes.

The sample chip 105 may be interfaced with the microanalysis chip 200 such that the pillars 101 of the sample chip 105 slidably pass into the wells 225 of the microanalysis chip 200. The sample surfaces 103 on the pillars 101 are then in communication with fluids flowing through the transfer-separation channels 226. One or more passive valves may be provided in the wells 225 to prevent fluids in the transfer-separation channels 226 from flowing out of them.

In some embodiments, reagents may be initially present in the reservoirs 223. The reagents may flow from the reservoirs 223, through the delivery channels 221, to the common delivery channel 240, to the distribution network 224, to the transfer-separation channels 226, and to the sample surfaces 103. Analytes on the sample surfaces 103 can come into contact with reagents (or other fluids) flowing in the transfer-separation channels 226 so that analytes at the sample surfaces 103 can be processed. The reagents delivered to the sample surfaces 103 may be used to remove the analytes (subunit mixture(s) or intact analytes) from the sample surfaces. The reagents may also be used for subsequent fluid transfer, concentrating analytes, purifying analytes and/or performing a chromatography process. As may be desired, further reactions (e.g., derivatization, labeling) that may aide in the subsequent mass spectrometric analysis (e.g., to improve sensitivity and/or mass spectrometric fragmentation) may also occur prior to transfer or chromatography.

The analysis assembly may then be positioned in front of the sampling orifice of the mass spectrometer using any suitable translation stage system. The fluids in the transfer-separation channels 226 of the microanalysis chip 200 may be delivered to a sampling port of a mass spectrometer using the nozzles 227 in the microanalysis chip 200. Depending on the characteristics of the mass spectrometer, the analysis may proceed in serial or parallel fashion. Intact analytes or subunit mixtures of the analytes may then be analyzed using the mass spectrometer.

Specific details of particular elements of the analysis assembly can be described with reference to FIGS. 21 to 34.

Figure 21:
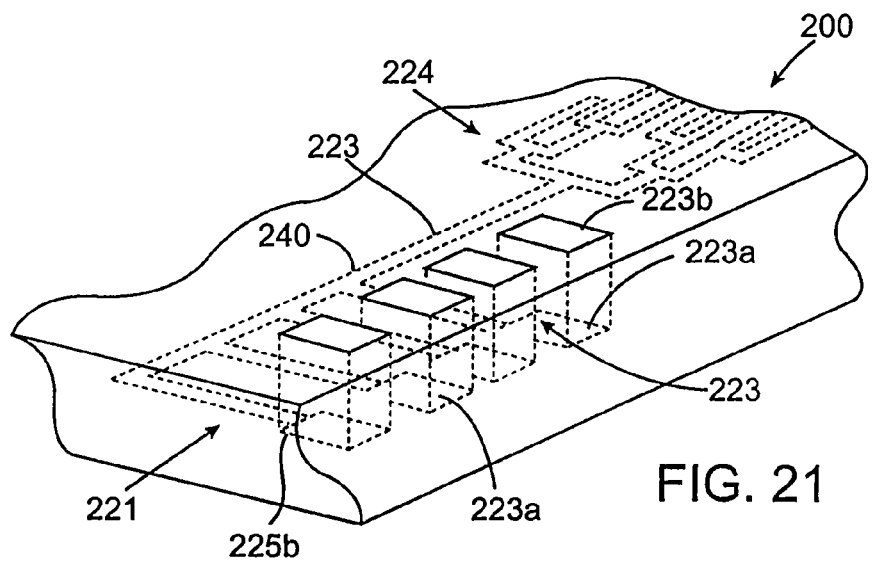
FIG. 21 is a perspective view of a portion of a microanalysis chip with reservoirs being shown by dotted lines.
Figure 22:
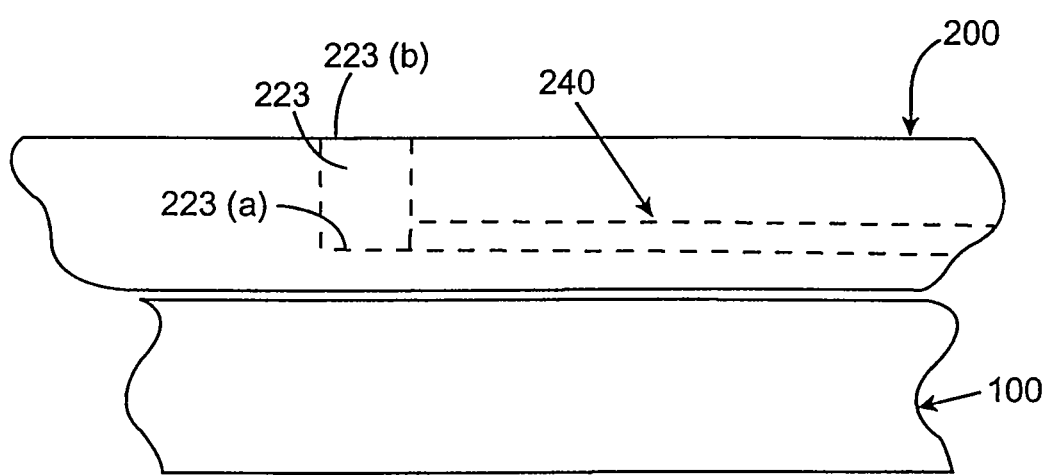
FIG. 22 is a side view of a portion of an analysis assembly showing a reservoir in dotted lines.

FIGS. 21 and 22 show the reservoirs 223 of the analysis chip 200 in further detail. Each reservoir 223 may be a cavity that has a bottom surface 223a and an open top 223b. Reagents and other fluids may be supplied to the reservoirs 223 through the open top 223b. Reagents that may be useful may include buffers (acid, neutral, basic), aqueous solutions of organic molecules, or solutions comprised of organic liquids. Each reservoir 223 may be coupled to a delivery channel 240 that may be coupled to a distribution network 224.

Figure 23:
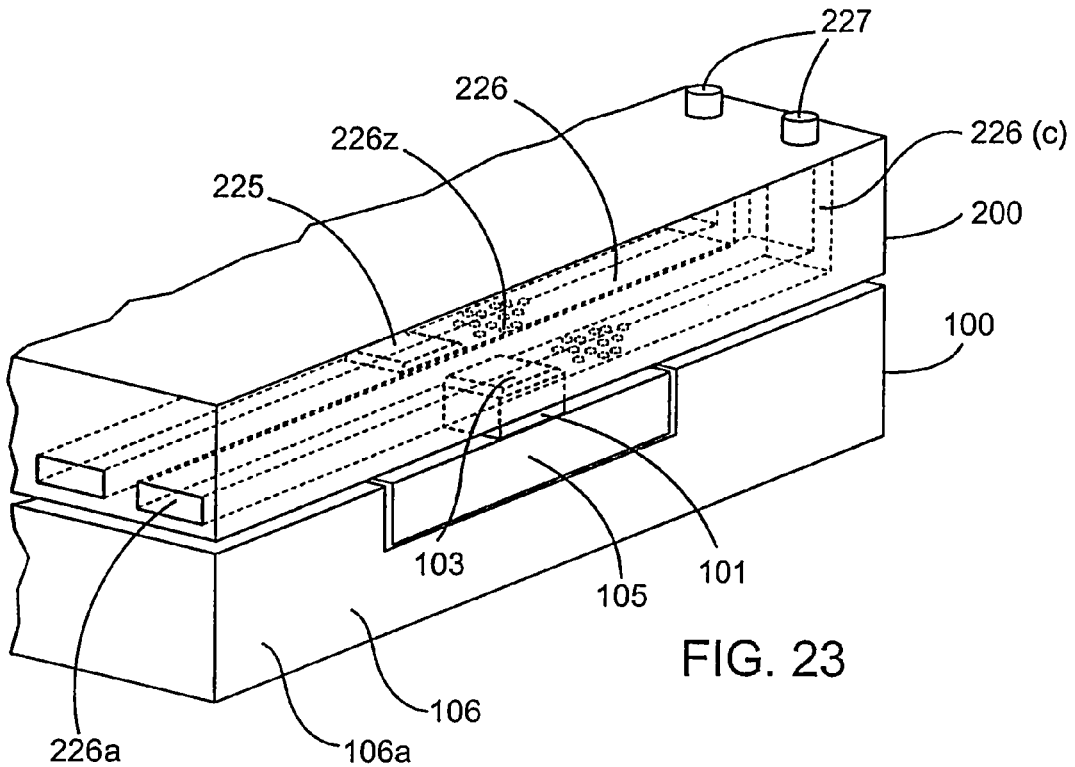
FIG. 23 is a perspective view of a portion of an analysis assembly with a chromatography/retention zone.
Figure 24:
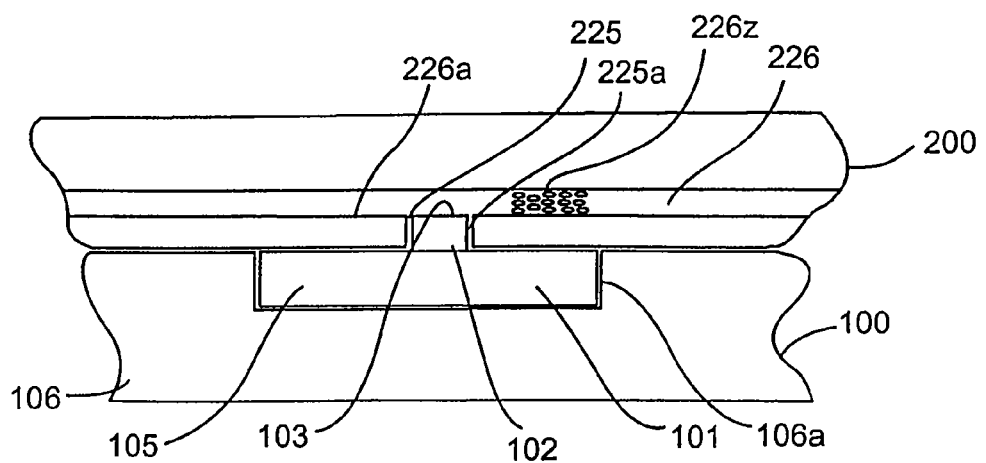
FIG. 24 is a perspective view of a portion of an analysis assembly with a seal.

Referring to FIGS. 23 and 24, each transfer-separation channel 226 has a channel bottom 226a that is interrupted by a well 225. The well 225 has well walls 225a and may be cooperatively arranged to receive a pillar 101 of the sample chip 105. The sample chip 105 may be in a depression 106a in the chip holder 106, so that the upper surfaces of the chip holder 100 and the base of the sample chip 105 are substantially coplanar with each other.

When the pillar 101 is in the well 225, the sample surface 103 on the pillar 101 may be substantially coplanar with the channel bottom 226a. In other embodiments, the sample surface 103 may be above or below the channel bottom 226a. If the sample surface 103 is below the channel bottom 226a, the well 225 may include a passive valve. For example, the well 225 may include one or more passive valves that may be the same as, or different than, the passive valves described with reference to FIGS. 10 to 17(d).

The transfer-separation channels 226 may have any suitable characteristics. For example, exemplary transfer-separation channels 226 may have a cross-sectional dimension (e.g., a width) in the range of from about 0.1 um to about 500 microns, or about 0.1 to about 100 microns (e.g., about 1 to about 100 or about 500 microns). The cross-sectional profile of the transfer-separation channel 226 may be square, rectangular, trapezoidal, round, or any other shape. Although the transfer-separation channels 226 shown in many of the Figures are straight, other configurations are possible (e.g., curves, serpentine, etc.). The configuration of the fluid channels may be varied to maximize the density of fluid channels and/or enhance the effectiveness of the chip (e.g., separation efficiency). In some embodiments, the channel portions of the substrates may be enclosed by a cover. In an alternate embodiment, the transfer-separation channels 226 are partially covered or fully uncovered to provide direct assess to the fluids flowing in the transfer-separation channels 226.

A concentration/chromatography zone 226z is in the transfer-separation channel 226 and is located downstream of the well 225 and the sample surface 103 on the pillar 101. The concentration/chromatography zone 226z may be used to concentrate or separate an analyte or a processed analyte before transferring it to an analysis device. For example, in some embodiments, after an analyte is processed at a sample surface 103, the analyte can flow downstream of the sample surface 103 and may be retained in the concentration/chromatography zone 226z. Additional analytes may subsequently be processed in a similar manner and may also be retained in the concentration/chromatography zone 226z. Once the concentration/chromatography zone 226z has the appropriate amount of analyte retained in it, an eluant fluid may pass through the concentration/chromatography zone 226z to elute the analyte. The eluted analyte may then pass downstream of the sample surface 103 in the transfer-separation channel 226z and to an analysis device such as a mass spectrometer. The analyte sample received at the mass spectrometer can have a high concentration of the processed analyte, thus making a subsequent analysis of the analyte less difficult. In other embodiments, the microanalysis chip need not have chromatography zones (see, e.g., FIGS. 25 and 26).

The concentration/chromatography zone may be composed of chromatographic packing material (e.g., beads, membrane, monolithic support, or chemically modified wall surface of the channel, or combinations there of). The concentration and purification of a fluid within the microanalysis chip may be accomplished by interaction with a stationary phase presented as particles in the channels or as a coating of the channel walls. The particles may have magnetic properties to allow for positioning of these particles within the channels. The stationary phase may be machined into the substrate of the channels using photolithography or other suitable means. In instances where chromatography is desirable, any number of modes may be utilized such as electrophoretic or liquid chromatography. Those skilled in the art will understand that chromatography includes, for example, affinity, ion, hydrophobic, reversed-phase as well as electrophoretic chromatographies (e.g., electrophoresis, isotachophoresis, electrochromatography, isoelectric focusing). The employed chromatography may be also multidimensional and not limited the number of modes or their ordering. For example, multimode separations such as electrophoresis followed reversed-phase separation may be employed. Any number of standard concentration schemes (e.g., solid-phase extraction, isotachophoresis) may be performed prior to or instead of chromatography and/or infusion of samples (e.g. subunit mixtures from analytes or intact analyte molecules).

Each transfer-separation channel 226 includes a discharge portion 226c that has a nozzle 227 such as an electrospray nozzle. That is, each discharge portion 226c terminates in a nozzle 227. The nozzle 227 can be used to control the discharge of fluid from the microanalysis chip 200. In this example, the discharge portion 226c is perpendicular to the main portion of the transfer-separation channel 226.

The nozzle 227 may be of any suitable type and may have any suitable characteristics. For example, the nozzles used in embodiments of the invention may have an inside diameter of about 0.1 to 100 microns and an outside diameter of about 1 to 500 microns. Exemplary nozzles that can be used include those described in PCT publication number WO 00/06388 entitled "Micro-Mechanically Produced Nozzle for Producing Reproducible Droplets," and PCT publication number WO 00/15321 entitled "Integrated Monolithic Microfabricated Electrospray and Liquid Chromatography System and Method". These publications are herein incorporated herein by reference for all purposes.

The nozzles may be fabricated in any suitable manner. For instance, the nozzles may be formed using a deep reactive ion etching (DRIE) process. Alternatively, the nozzles may be made from capillary tubes that are then inserted into fluid channels in the analysis chip. The capillary tubes may made of, for example, glasses, polymers, metals, or composite materials.

Figure 25:
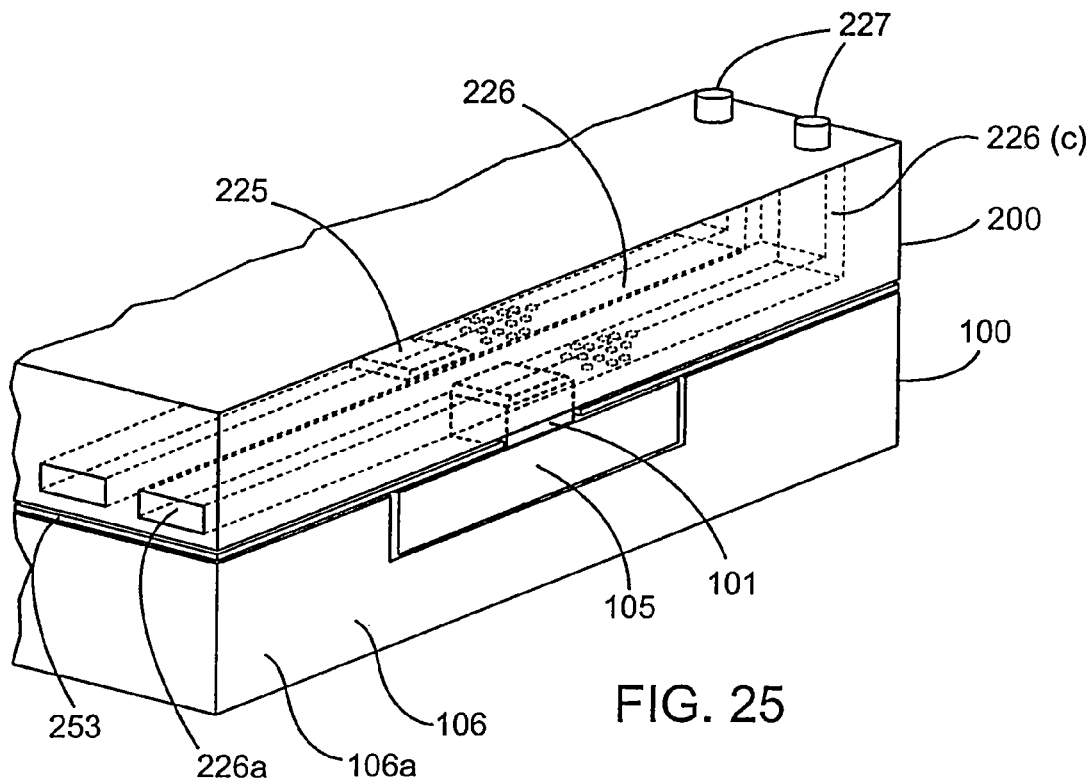
FIG. 25 is a side cross-sectional view of an analysis assembly with a seal.
Figure 26:
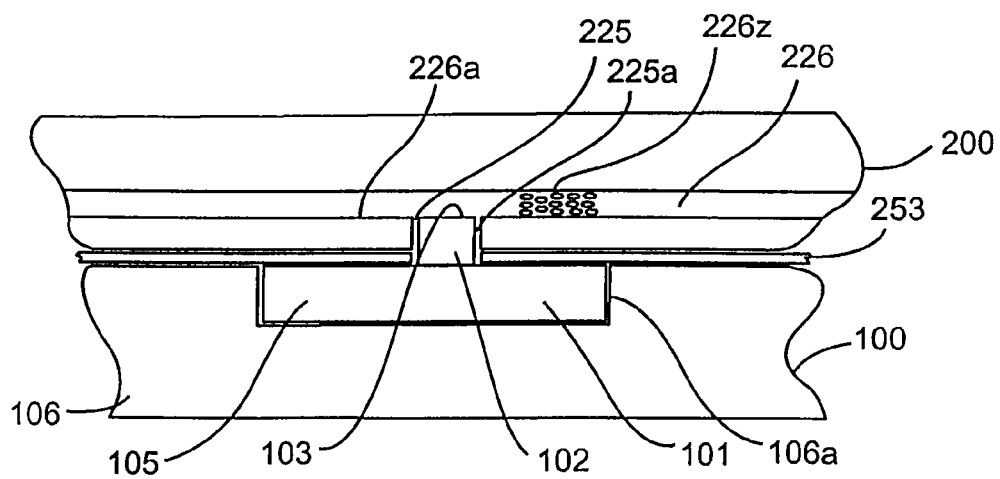
FIG. 26 is a perspective view of a portion of an analysis assembly with a lid.

FIGS. 25 to 26 show analysis assembly embodiments with a seal member 253 between a microanalysis chip 200 and a sample chip 105. The seal member 253 prevents fluid leakage from around the pillars 101 out of the wells 125 and the transfer-separation channels 226. For example, the seal member 253 prevents liquid from flowing out of wells 125 and onto the sample chip 105. Assemblies comprising a seal member 253 may be employed with or without the passive valves. In some embodiments, the seal member 253 may include a soft, elastomeric polymeric material (e.g., polydimethylsiloxane). Also, the configuration of the seal member 253 may vary. In one embodiment, the seal member 253 may be a ring that seals the periphery region between a microanalysis chip and a chip assembly. In another embodiment, the seal member 253 may be in the form of a perforated layer. The pillars of a sample chip can extend through the perforations in the perforated layer.

FIGS. 27 to 29 show an analysis assembly comprising a microanalysis chip 200 and a sample chip 105. In this example, the microanalysis chip 200 includes a lid 230 that supports the nozzles 227. The lid 230 may have nozzles 227. Each nozzle 227 defines a discharge aperture 201. In other embodiments, the microanalysis chip 200 may have a discharge apertures 201 without a corresponding nozzle.

Figure 30:
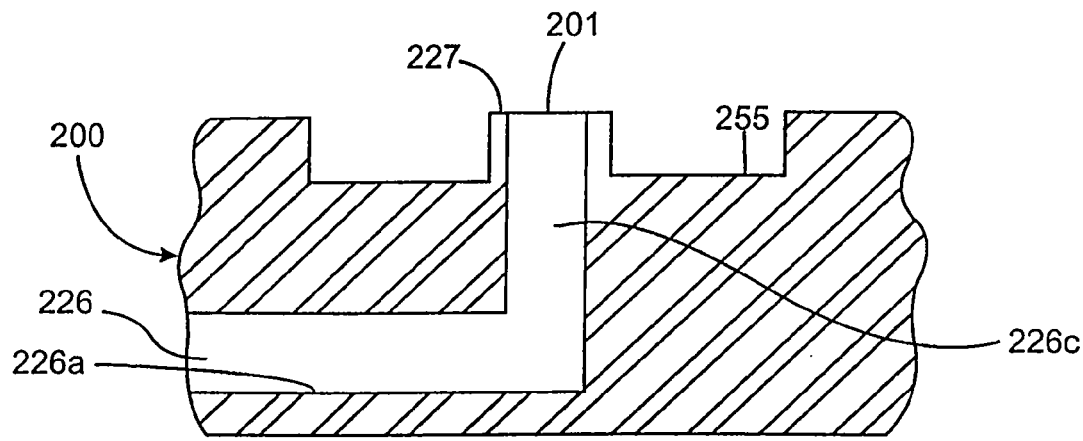
Figure 31:
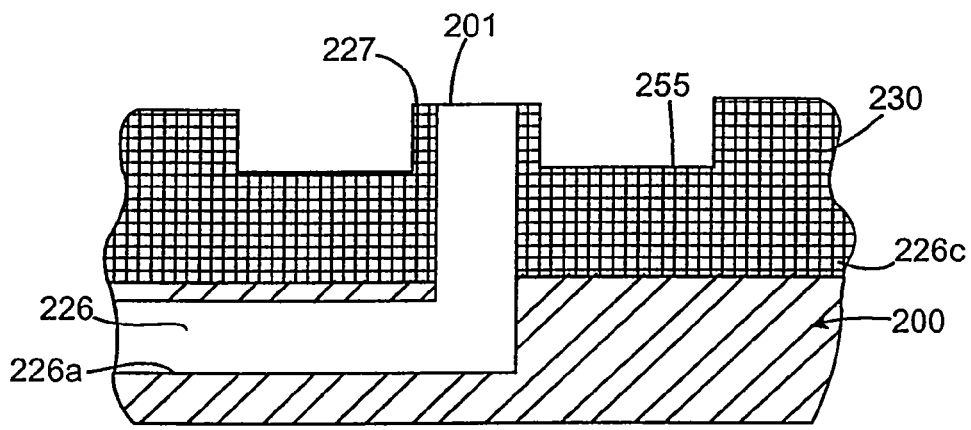
Figure 32:
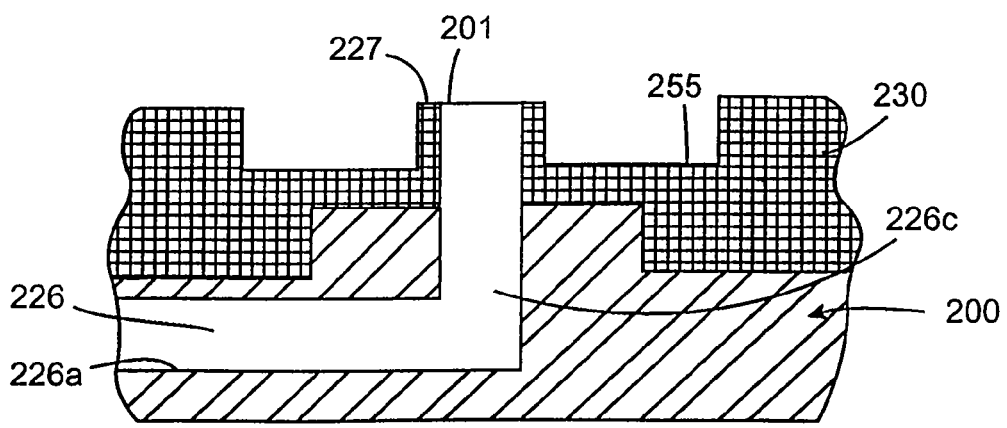
Figure 33:
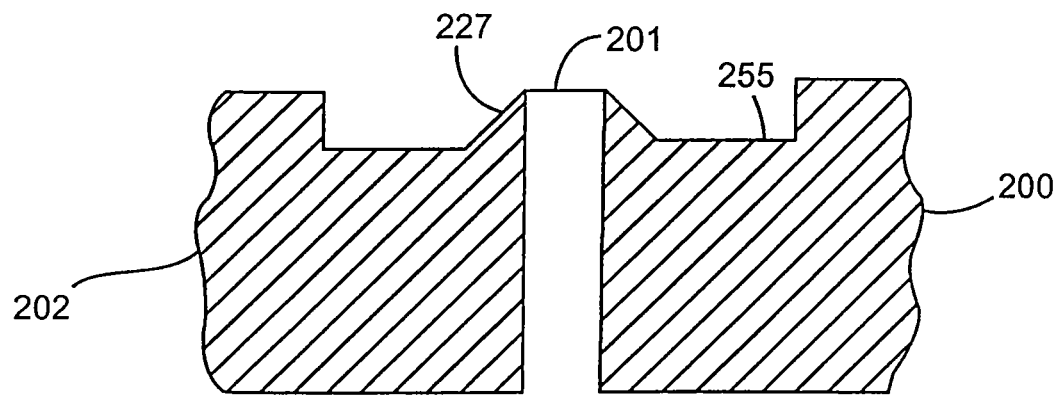
Figure 34:
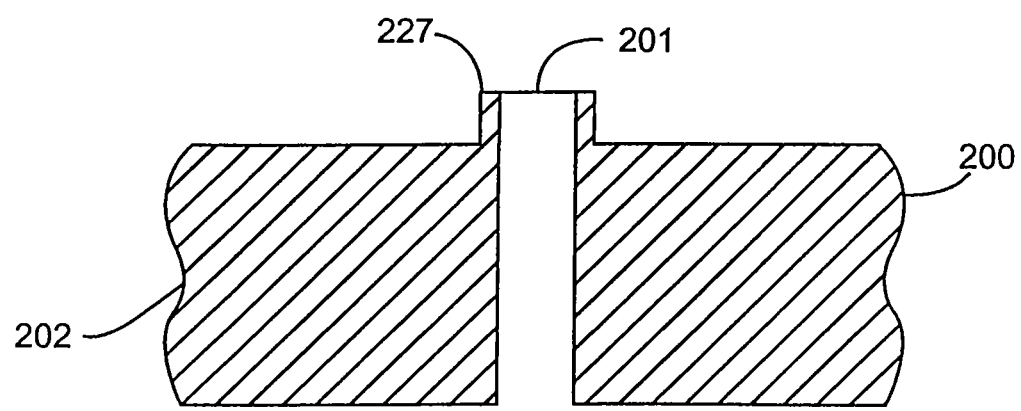

FIGS. 30 to 34 show cross-sections of portions of the analysis chips where the discharge nozzles are present. Each analysis chip includes a nozzle 227 and a discharge aperture 201. The embodiments shown in FIGS. 30-33 also include a well region 255 around the nozzle 227. The embodiments shown in FIGS. 30 to 32 show discharge channel portions 226c in the transfer-separation channels 226. The discharge channel portions 226c are substantially perpendicular to the other portions of the transfer-separation channels 226.

III. Analytical Systems

The dispenser assemblies and analytical assemblies may be used in an analytical system. The analytical system can include an analysis device such as a mass spectrometer. In other embodiments, the analysis device may be an optical analysis device or an electrical analysis device.

Figure 35:
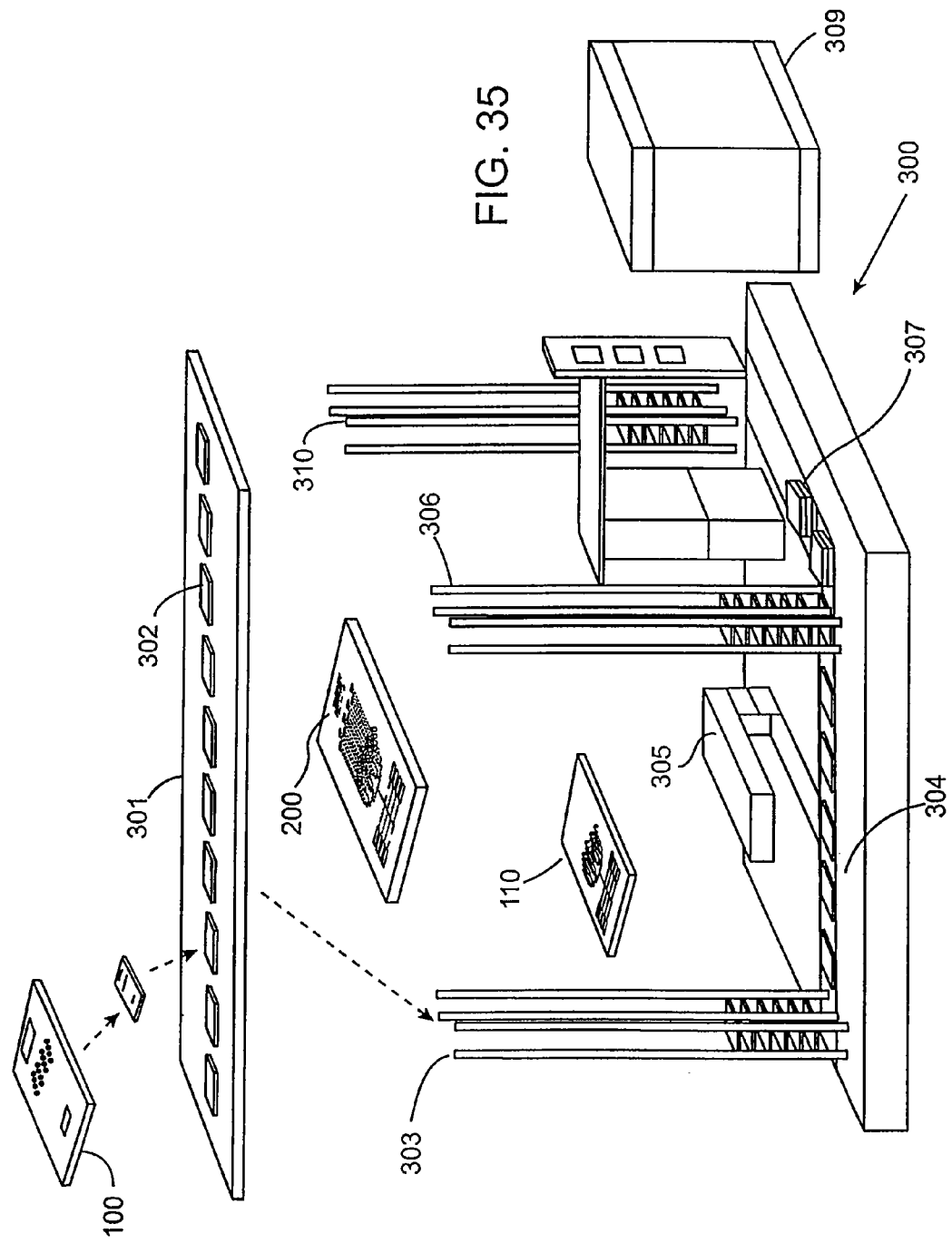
FIG. 35 shows a schematic drawing of a system embodiment of the invention.

FIG. 35 shows an exemplary analytical system. The analytical system 300 includes multiple chip assemblies 100 that may be on a support element 301. Each chip assembly 100 may include one or more sample chips. Each sample chip may include sample structures comprising pillars and samples surfaces. The support element 301 may have depressions that are structured so that a chip assembly 100 may be secured to the support element 301.

The support elements 301 containing the chip assemblies 100 may be stacked in a first stacking device 303. The first stacking device 303 may then unload chip assemblies 100 in a sequential manner onto a conveyor system 304 that allows movement of the chip assemblies 100 to multiple stations. A first station may be a reagent dispensing station 305 where a dispensing chip 110 is interfaced with a sample chip of a corresponding chip assembly 100. The dispensing chip 110 may dispense reagents onto the sample surfaces of a sample chip. The dispensed reagents may include, for example, substances that can cleave proteins into peptide subunits. Next, the chip assemblies 100 are transported to a second station.

At the second station, a second stacking device 306 may contain a stack of microanalysis chips 200. A microanalysis chip 200 may be interfaced with a sample chip of a chip assembly 100 at the second station to form an analysis assembly 307. As explained above, reagents may be delivered to the sample surfaces of the sample chip using the microanalysis chip 200.

The analysis assembly 307 may then be presented to a mass spectrometer 309. A movable stage device 308 may move the analysis assembly 307 in an x-, y-, and/or z-direction. In some embodiments, nozzles (not shown) in the analysis assembly 307 can be aligned with a sampling orifice (not shown) in the mass spectrometer 309. Processed analytes can be delivered from the nozzles of the analysis assembly 307 to the sample orifice. The mass spectrometer 309 can then be used to analyze the received analytes. Analyzed sample chips and their associated chip holders may then be stored in a third stacking device 310 after analyzing.

The system embodiments of the invention provide a number of advantages. For example, the system shown in FIG. 35 can be used to continuously process a number of sample chips, each having a plurality of analytes. In comparison to 2-D gel processes, for instance, embodiments of the invention can be used to process and analyze significantly more analytes in less time and at reduced cost.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. For example, any feature of the sample structures, pillars or the passive valves described with reference to FIGS. 2 to 17 can be incorporated into any of the analysis assemblies, microanalysis chips, or systems shown in FIGS. 18 to 35 without departing from the scope of the invention.

What is claimed is:

1. An analyte detection device comprising a substrate and a plurality of pillars attached to the surface of the substrate, wherein each pillar comprises a sample surface and side surfaces, each of the side surfaces perpendicular to the surface of the substrate, and wherein the sample surface of each pillar and the surface of the substrate have the same coating, and wherein each pillar comprises a porous material.

2. The device of claim 1, wherein the side surfaces of each pillar, the sample surface of each pillar, and the surface of the substrate have the same coating.

3. The device of claim 1, further comprising an interlayer between the sample surfaces and the coating on the sample surfaces.

4. The device of claim 1, further comprising an interlayer between the substrate surface and the coating on the substrate surface.

5. The device of claim 3 or 4, wherein the interlayer comprises silicon oxide.

6. The device of claim 1 or 2, wherein the coating further comprises an affinity structure.

7. The device of claim 6, wherein the affinity structure comprises a monolayer of an organic molecule.

8. The device of claim 7, wherein the organic molecule is polylysine or polyethylene glycol.

9. The device of claim 6, wherein the affinity structure comprises a capture agent.

10. The device of claim 6, wherein the capture agent comprises an antibody, antibody fragment, polypeptide, receptor, DNA strand or fragment, RNA strand or fragment, or aptamer.

11. The device of claim 6, wherein the affinity structure comprises biotin, avidin, or streptavidin.

12. The device of claim 1, wherein the substrate and plurality of pillars are made of the same material.

13. The device of claim 1, wherein the substrate and plurality of pillars are made of different materials.

14. The device of claim 1, wherein the plurality of pillars are made of a porous material.

15. The device of claim 1, wherein the sample surface of each pillar is located distal to the substrate surface.

16. The device of claim 1, wherein the plurality of pillars are substantially perpendicular with respect to the surface of the substrate.

17. The device of claim 1, wherein the plurality of pillars range in height from about 1 to 200 microns.

18. The device of claim 1, wherein the plurality of pillars are arranged in a regular array.

19. The device of claim 1, wherein the plurality of pillars are arranged in an irregular array.

20. The device of claim 1, wherein the density of the plurality of pillars is about 25 pillars/cm$^2$ or greater.

21. The device of claim 1, wherein the number of pillars per device is greater than 10, 100, or 1000 pillars.

22. The device of claim 1, wherein the pillar pitch is 500 microns or less.

23. The device of claim 1, wherein the sample surface of each pillar or coating of each pillar binds an analyte.

24. The device of claim 1, wherein the analyte is selected from the group consisting of pharmaceuticals, metabolites, pesticides, polypeptides, proteins, DNA, and RNA.

* * * * *